United States Patent
Ozasa et al.

(10) Patent No.: US 9,949,036 B2
(45) Date of Patent: Apr. 17, 2018

(54) ELECTRONIC DEVICE

(71) Applicant: Kyocera Corporation, Kyoto (JP)

(72) Inventors: Kenichi Ozasa, Yokohama (JP);
Takaaki Watanabe, Kawasaki (JP);
Hiroto Yahagi, Yokohama (JP); Hayato Mizuno, Osaka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/107,871

(22) PCT Filed: Dec. 22, 2014

(86) PCT No.: PCT/JP2014/006392
§ 371 (c)(1),
(2) Date: Jun. 23, 2016

(87) PCT Pub. No.: WO2015/098090
PCT Pub. Date: Jul. 2, 2015

(65) Prior Publication Data
US 2016/0337757 A1   Nov. 17, 2016

(30) Foreign Application Priority Data

Dec. 26, 2013  (JP) ................................. 2013-270042
Jan. 30, 2014  (JP) ................................. 2014-016045

(51) Int. Cl.
*H04R 17/00* (2006.01)
*H04R 15/00* (2006.01)
(Continued)

(52) U.S. Cl.
CPC ............ *H04R 15/00* (2013.01); *H04M 1/035* (2013.01); *H04R 7/04* (2013.01); *H04R 7/18* (2013.01);
(Continued)

(58) Field of Classification Search
CPC ............................ H04R 17/00; H04R 2460/13;
H04R 2499/11; H04M 1/0266; H04M 1/035
See application file for complete search history.

(56) References Cited

U.S. PATENT DOCUMENTS 6,332,029 B1 * 12/2001 Azima ................. B42D 15/022
181/166
6,795,561 B1 *  9/2004 Bank ...................... H04R 7/045
381/152
(Continued)

FOREIGN PATENT DOCUMENTS

JP   2004-272651 A    9/2004
JP   2005-348341 A   12/2005
(Continued)

OTHER PUBLICATIONS

International Search Report, PCT/JP2014/006392 dated Apr. 7, 2015.
(Continued)

*Primary Examiner* — Matthew Eason
(74) *Attorney, Agent, or Firm* — Studebaker & Brackett PC

(57) ABSTRACT

An electronic device in which a vibration generator is attached to a panel allows further improvement in sound pressure characteristics. An electronic device (1) includes a housing (60), a panel (10) held by the housing (60), a vibration generator (30) attached to the panel (10), and a sheet member (80) between the housing (60) and the panel (10). The panel (10) deforms due to deformation of the vibration generator (30) to transmit human body vibration sound to an object that contacts the panel (10). A first portion of the sheet member (80) is joined to the panel (10), and a second portion of the sheet member (80) differing from the first portion is joined to the housing (60). Between the first
(Continued)

portion and the second portion, the sheet member (80) includes an area to which neither the panel (10) nor the housing (60) is attached.

25 Claims, 15 Drawing Sheets

(51) Int. Cl.
*H04R 7/04* (2006.01)
*H04R 7/18* (2006.01)
*H04M 1/03* (2006.01)

(52) U.S. Cl.
CPC ........... *H04R 17/005* (2013.01); *H04R 17/00* (2013.01); *H04R 2460/13* (2013.01); *H04R 2499/11* (2013.01)

(56) References Cited

U.S. PATENT DOCUMENTS

| | | |
|---|---|---|
| 8,521,239 B2 | 8/2013 | Hosoi et al. |
| 8,884,897 B2 | 11/2014 | Sashida et al. |
| 9,257,631 B2 | 2/2016 | Fujii et al. |
| 9,318,688 B2 | 4/2016 | Fujii et al. |
| 9,439,000 B1* | 9/2016 | Daley ................... H04R 17/00 |
| 2004/0202338 A1* | 10/2004 | Longbotttom ......... H04R 17/00 381/190 |
| 2006/0097996 A1 | 5/2006 | Tabata |
| 2012/0028679 A1* | 2/2012 | Ozasa ................. H04M 1/0266 455/556.1 |
| 2012/0149437 A1* | 6/2012 | Zurek ................. H04M 1/0266 455/566 |
| 2012/0249459 A1 | 10/2012 | Sashida et al. |
| 2012/0289162 A1 | 11/2012 | Hosoi et al. |
| 2013/0324193 A1 | 12/2013 | Hosoi et al. |
| 2014/0132115 A1 | 5/2014 | Fujii et al. |
| 2014/0232243 A1 | 8/2014 | Fujii et al. |
| 2014/0378191 A1* | 12/2014 | Hosoi ................. H04M 1/6066 455/575.1 |
| 2015/0163598 A1 | 6/2015 | Abe et al. |

FOREIGN PATENT DOCUMENTS

| | | |
|---|---|---|
| JP | 2006-139371 A | 6/2006 |
| JP | 2007-027922 A | 2/2007 |
| JP | 2011-205497 A | 10/2011 |
| JP | 2012-074526 A | 4/2012 |
| JP | 2012-141001 A | 7/2012 |
| JP | 2012-203895 A | 10/2012 |
| JP | 2013-017009 A | 1/2013 |
| JP | 5255142 B1 | 4/2013 |
| JP | 2013-211823 A | 10/2013 |
| JP | 2013-243615 A | 12/2013 |
| WO | 2013/150667 A1 | 10/2013 |

OTHER PUBLICATIONS

Written Opinion of the International Searching Authority with Concise Explanation, PCT/JP2014/006392 dated Apr. 7, 2015.

* cited by examiner

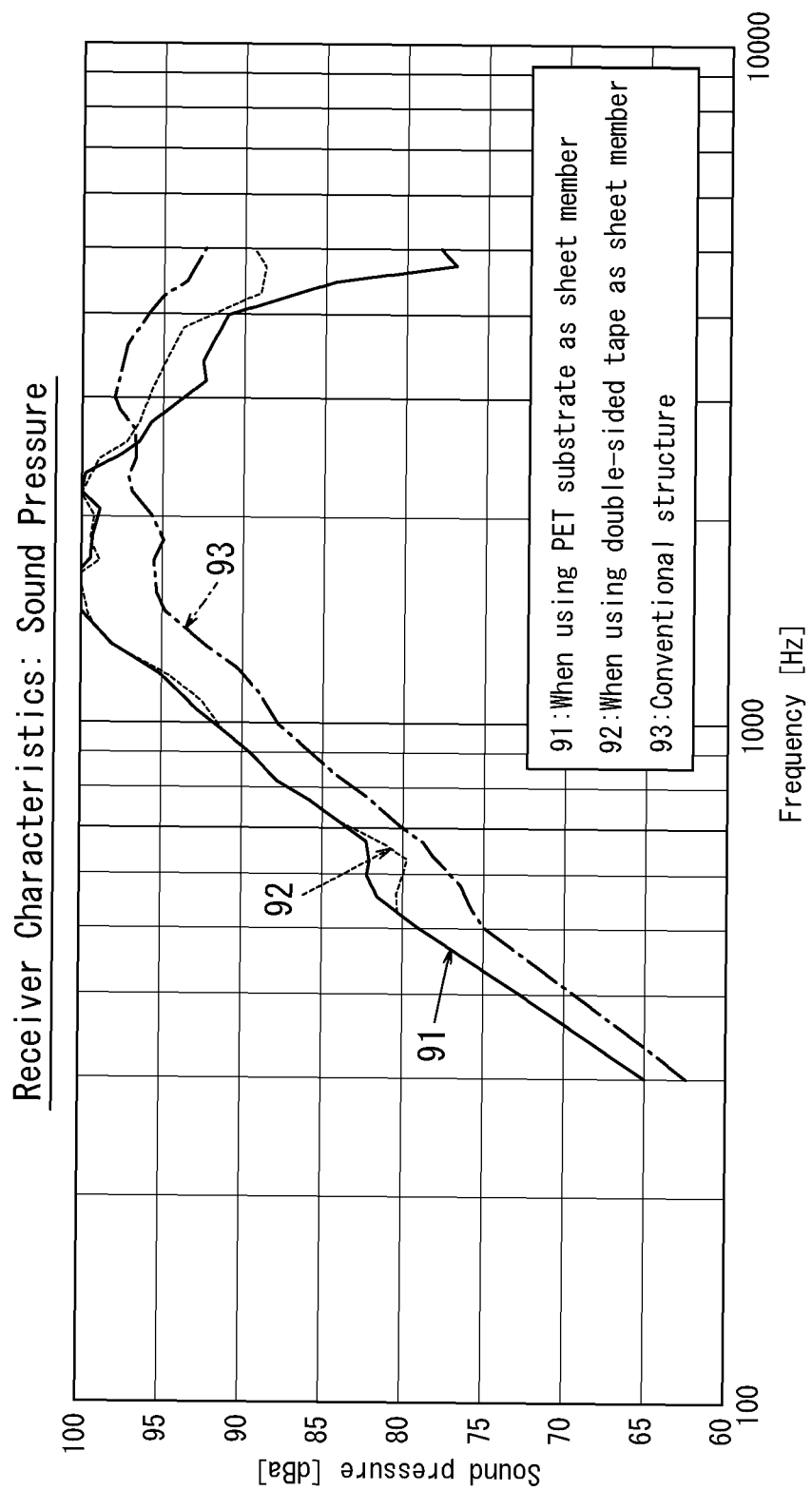

ELECTRONIC DEVICE

CROSS-REFERENCE TO RELATED APPLICATIONS

This application claims priority to and the benefit of Japanese Patent Application No. 2013-270042 filed Dec. 26, 2013 and Japanese Patent Application No. 2014-016045 filed Jan. 30, 2014, the entire contents of which are incorporated herein by reference.

TECHNICAL FIELD

This disclosure relates to an electronic device that is configured to vibrate a panel by applying a predetermined electric signal to a vibration generator and to transmit sound to a user by transmitting the vibration of the panel to the user's body.

BACKGROUND

JP 5255142 B2 (PTL 1) discloses an electronic device, such as a mobile phone terminal, that transmits human body vibration sound to an object that contacts a panel by vibrating the panel due to deformation of a vibration generator attached to the panel. As human body vibration sound, PTL 1 discloses a sound that is transmitted to the user's auditory nerve through a portion of the user's body (such as the cartilage of the outer ear) that is contacting a vibrating object.

CITATION LIST

Patent Literature

PTL 1: JP 5255142 B2

SUMMARY

Technical Problem

In the electronic device disclosed in PTL 1, there is a desire for further improvement in sound pressure characteristics for a variety of uses.

As an electronic device in which a vibration generator is attached to a panel, it would therefore be helpful to provide an electronic device that allows further improvement in sound pressure characteristics.

Solution to Problem

An electronic device according to this disclosure includes a housing; a panel held by the housing; a vibration generator attached to the panel; and a sheet member between the housing and the panel; such that the panel deforms due to deformation of the vibration generator to transmit human body vibration sound to an object that contacts the panel; a first portion of the sheet member is joined to the panel, and a second portion of the sheet member differing from the first portion is joined to the housing; and between the first portion and the second portion, the sheet member includes an area to which neither the panel nor the housing is attached.

The area of the sheet member may deform along with deformation of the panel.

The area of the sheet member may deform in a direction parallel to a direction of vibration of the panel.

The area of the sheet member may deform in a direction perpendicular to a direction of vibration of the panel.

The vibration generator may be attached to a surface of the sheet member opposite a surface of the sheet member attached to the panel; and in plan view of the panel, an area of the sheet member where the panel is attached may at least overlap an area of the sheet member where the vibration generator is attached.

The area of the sheet member to which neither the panel nor the housing is attached may be formed adjacent to the area of the sheet member where the panel is attached or adjacent to the area of the sheet member where the vibration generator is attached.

A width of the area of the sheet member in a direction of a short side of the panel may be changeable.

The sheet member may be made of one of PET film, an acrylic film, and a polyamide resin film.

The sheet member may be a touch panel.

The sheet member may be an anti-scattering sheet that prevents scattering of glass forming the panel.

The sheet member may be double-sided tape.

A configuration may be adopted in which in the double-sided tape, an adhesive layer is not disposed in the area to which neither the panel nor the housing is attached.

An electronic device according to this disclosure includes a housing; a panel held by the housing; a vibration generator attached to the panel; and a sheet member between the housing and the panel; such that the panel deforms due to deformation of the vibration generator to transmit human body vibration sound to an object that contacts the panel; a first portion of the sheet member is joined to the panel, and a second portion of the sheet member differing from the first portion is joined to the housing; and between the first portion and the second portion, the sheet member includes a deformation area.

An electronic device according to this disclosure includes a housing; a panel held by the housing; and a vibration generator attached to the panel; such that the panel vibrates due to deformation of the vibration generator to transmit human body vibration sound to an object that contacts the panel; a first end of the panel is attached to the housing by a joining member; a second end of the panel opposite the first end is joined to the housing by a sheet member; a first portion of the sheet member is joined to the panel, and a second portion of the sheet member differing from the first portion is joined to the housing; and a fixation strength between the second end of the panel and the housing is lower than a fixation strength between the first end of the panel and the housing.

An electronic device according to this disclosure includes a housing; a panel attached to the housing; and a vibration generator attached to the panel; such that the panel deforms due to deformation of the vibration generator to transmit human body vibration sound to an object that contacts the panel; and an end of the panel where the vibration generator is attached is a free end.

On a surface of the panel attached to the housing, the vibration generator may be attached to an area farther outward than an area attached to the housing.

The panel may be attached to the housing farther inward than a position farthest from the end of the panel that is a free end within the area where the vibration generator is attached to the panel.

A film-shaped substrate attached to a surface of the vibration generator opposite a surface of the vibration generator attached to the panel may be further included; the substrate may include an extension extending from an area of the substrate attached to the vibration generator; and a partial area of the extension may be joined to the panel, and an area opposite the partial area joined to the panel may be joined to the housing.

The extension may be joined to the panel by a first joining member and joined to the housing by a second joining member; and the extension may be in close contact with and covered by the first joining member and the second joining member.

At least one of the first joining member and the second joining member may be silicone gel.

A ring-shaped member may be further included; the extension may be inserted into a hollow portion of the ring-shaped member and sandwiched by the ring-shaped member; and the extension may be joined to the panel and the housing via the ring-shaped member.

An area of the substrate connected to the vibration generator may be covered by an insulating member.

The panel may include a plate-shaped portion and a curved portion extending from one end of the plate-shaped portion; the vibration generator may be attached to the curved portion of the panel; and the curved portion of the panel may be a free end.

The panel may include a first surface and a second surface formed integrally with the first surface where an end of the panel is bent; the vibration generator may be attached to the second surface of the panel; and the second surface of the panel may be a free end.

The vibration generator may be formed by a magnetostrictor and a coil.

The vibration generator may be formed by a piezoelectric element.

Advantageous Effect

This disclosure provides an electronic device in which a vibration generator is attached to a panel and that allows further improvement in sound pressure characteristics.

BRIEF DESCRIPTION OF THE DRAWINGS

In the accompanying drawings:

FIG. 8 illustrates frequency characteristics of the electronic device according to Embodiment 1;

DETAILED DESCRIPTION

Figure 1:
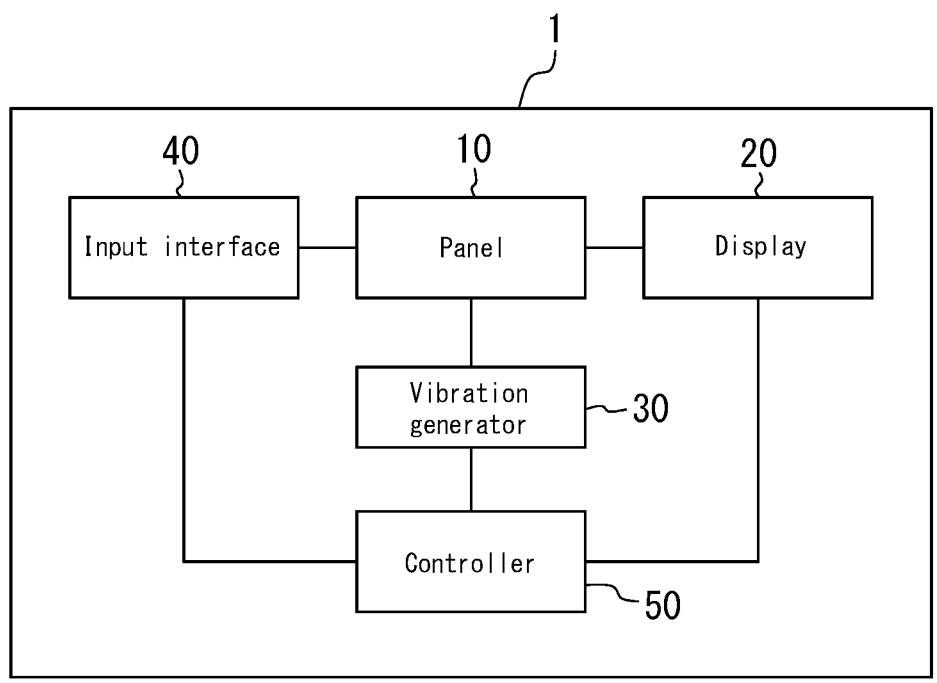
FIG. 1 illustrates the functional blocks of an electronic device according to Embodiment 1.

Embodiment 1 is described below in detail with reference to the accompanying drawings. FIG. 1 illustrates the functional blocks of an electronic device 1 according to Embodiment 1. The electronic device 1 is, for example, a mobile phone (smartphone) and includes a panel 10, a display 20, a vibration generator 30, an input interface 40, and a controller 50.

The panel 10 is a touch panel that detects contact, a cover panel that protects the display 20, or the like. The panel 10 may, for example, be made from glass, a synthetic resin such as acrylic, or sapphire. As used herein, sapphire refers to industrially produced aluminum oxide ($AlO_3$) crystals. The panel 10 may be plate-like in shape. The panel 10 may be a flat plate or may be a curved panel having a portion with a curved surface. A panel with a curved surface for example also includes a panel in which the surface constituting the outside of the electronic device 1 has a concavity in the central portion thereof, whereas the surface constituting the inside of the electronic device 1 is flat. With such a panel, when the user presses the electronic device 1 against the temporal region in order to talk on the phone, the concave surface of the panel 10 easily fits on the user's temporal region, thus improving usability. Furthermore, since the surface of the panel 10 on the inside of the electronic device 1 is flat, the panel 10 can easily be attached to the display 20 even if the display 20 is, for example, a flat plate with little flexibility. When the panel 10 is a touch panel, the panel 10 detects contact by the user's finger, a pen, a stylus pen, or the like. Any detection method may be used in the touch panel, such as a capacitive system, a resistive film system, a surface acoustic wave system (or an ultrasonic wave system), an infrared system, an electromagnetic induction system, a load detection system, or the like.

The display 20 is a display device such as a liquid crystal display, an organic EL display, an inorganic EL display, or the like. The display 20 may also be a flexible display. The properties of a suitable flexible display are, for example, a thickness of approximately 0.1 mm and a curvature radius of approximately 4 mm. An organic EL display is most appropriate for this case. The display 20 is provided on the back face of the panel 10. The display 20 is disposed on the back face of the panel 10 by a joining member (for example, adhesive). The display 20 may be disposed at a distance from the panel 10 and supported by the housing of the electronic device 1. Alternatively, in another embodiment, the display 20 may be joined to the back face of the panel 10 by a joining member (for example, adhesive). For example, the joining member may be elasticity resin, such as optical elasticity resin, in which the index of refraction of transmitted light is controlled. The display 20 displays a variety of information through the joining member and the panel 10.

The vibration generator 30 generates mechanical vibration (displacement) upon application of an electric signal (voltage). At this point, the panel 10 to which the vibration generator 30 is attached deforms (vibrates) in conjunction with displacement of the vibration generator 30. As a result, the panel 10 generates air-conducted sound. The panel 10 also transmits human body vibration sound to an object that contacts the panel 10. In greater detail, vibration of the panel 10 passes through soft tissue of the human body (for example, cartilage of the outer ear), is transmitted to the middle ear or inner ear, and vibrates the middle ear or inner ear to transmit sound. The vibration generator 30 may, for example, be configured with a magnetostrictor and a coil or configured with a piezoelectric element.

A magnetostrictor is an element formed from magnetostrictive material that, when located in a magnetic field, has the property of expanding in the direction of the magnetic field. Among such materials, magnetostrictive materials that are typified by alloys of rare-earth elements and iron and that exhibit variation exceeding 1000 ppm are referred to as giant magnetostrictive materials. When a coil is disposed around a magnetostrictor and a magnetic field is produced by the coil in response to an electric signal (voltage) supplied from the outside, the magnetostrictor is displaced and strikes the panel 10 abutting the magnetostrictor (alternatively, for example a rod-shaped member may be disposed between the magnetostrictor and the panel 10, and the magnetostrictor may strike the panel 10 via the rod-shaped member). The panel 10 vibrates by being struck by the magnetostrictor and transmits human body vibration sound to an object that contacts the panel 10. As described above, a magnetostrictor is formed from a metal alloy and therefore does not have the brittleness that characterizes the below-described piezoelectric element. As compared to a piezoelectric element, a magnetostrictor is less likely to be damaged by an external shock.

A piezoelectric element is formed by elements that, upon application of an electric signal, either expand and contract or bend in accordance with the electromechanical coupling coefficient of their constituent material. Ceramic or crystal elements, for example, may be used. The piezoelectric element may be a unimorph, bimorph, or laminated piezoelectric element. Examples of a laminated piezoelectric element include a laminated bimorph element with layers of bimorph (for example, 16 or 24 layers). Such a laminated piezoelectric element may be configured with a laminated structure formed by a plurality of dielectric layers composed of, for example, lead zirconate titanate (PZT) and electrode layers disposed between the dielectric layers. Upon application of an electric signal, the laminated piezoelectric element causes flexural displacement in the lamination direction of each layer, i.e. in the thickness direction. The panel 10 to which the piezoelectric element is attached vibrates in conjunction with displacement of the piezoelectric element and transmits human body vibration sound to an object that contacts the panel 10. Whereas a coil needs to be disposed around a magnetostrictor to cause displacement of the magnetostrictor, a piezoelectric element does not require such a member. Therefore, as compared to a magnetostrictor, a piezoelectric element simplifies the structure of the vibration generator.

The input interface 40 accepts operation input from the user and may be configured, for example, using operation buttons (operation keys). Note that when the panel 10 is a touch panel, the panel 10 can also accept operation input from the user by detecting contact by the user.

The controller 50 is a processor that controls the electronic device 1. The controller 50 applies a predetermined electric signal (a voltage corresponding to an audio signal) to the vibration generator 30. Upon the controller 50 applying an electric signal to the vibration generator 30, the vibration generator 30 causes flexural displacement in the thickness direction. At this point, the panel 10 to which the vibration generator 30 is attached deforms in conjunction with displacement of the vibration generator 30, causing the panel 10 to vibrate. Therefore, the panel 10 generates air-conducted sound. The panel 10 also transmits human body vibration sound to an object that contacts the panel 10. The object is, for example, a portion of the user's body (such as cartilage of the outer ear). For example, the controller 50 can apply an electric signal, corresponding to an audio signal related to the other party's voice, to the vibration generator 30 to generate air-conducted sound and human body vibration sound that correspond to the audio signal. The audio signal may be related to ringtones, music including songs, or the like. Note that the audio signal pertaining to the electric signal may be based on music data stored in an internal memory of the electronic device 1 or may be music data that is stored on an external server or the like and is played back over a network. The voltage that the controller 50 applies to the vibration generator 30 may, for example, be ±15 V. This is higher than ±5 V, i.e. the applied voltage of a so-called panel speaker for conduction of sound by air-conducted sound rather than human body vibration sound. In this way, even if the user presses the panel 10 against the user's body for example with a force of 3 N or greater (a force of 5 N to 10 N), sufficient vibration is generated in the panel 10 to allow generation of human body vibration sound that passes through a part of the user's body. Note that the magnitude of the applied voltage used may be appropriately adjusted in accordance with the fixation strength of the panel 10 with respect to the housing or a support member, or in accordance with the performance of the vibration generator 30.

The panel 10 vibrates not only in the attachment region in which the vibration generator 30 is attached, but also in a region separate from the attachment region. In the region of vibration, the panel 10 includes a plurality of locations at which the panel 10 vibrates in a direction intersecting the principal surface of the panel 10. At each of these locations, the value of the vibration amplitude changes over time from positive to negative or vice-versa. At a given instant during vibration of the panel 10, portions with a relatively large vibration amplitude and portions with a relatively small vibration amplitude appear to be distributed randomly or cyclically over nearly the entire panel 10. In other words, a plurality of vibration waves are detected across the entire panel 10. The voltage that the controller 50 applies to the vibration generator 30 may be ±15 V to prevent damping of the above-described vibration of the panel 10 even if the user presses the panel 10 against the user's body with a force of, for example, 5 N to 10 N. Therefore, the user can hear sound by contacting a region distant from the above-described attachment region of the panel 10 to the ear.

Figure 2:
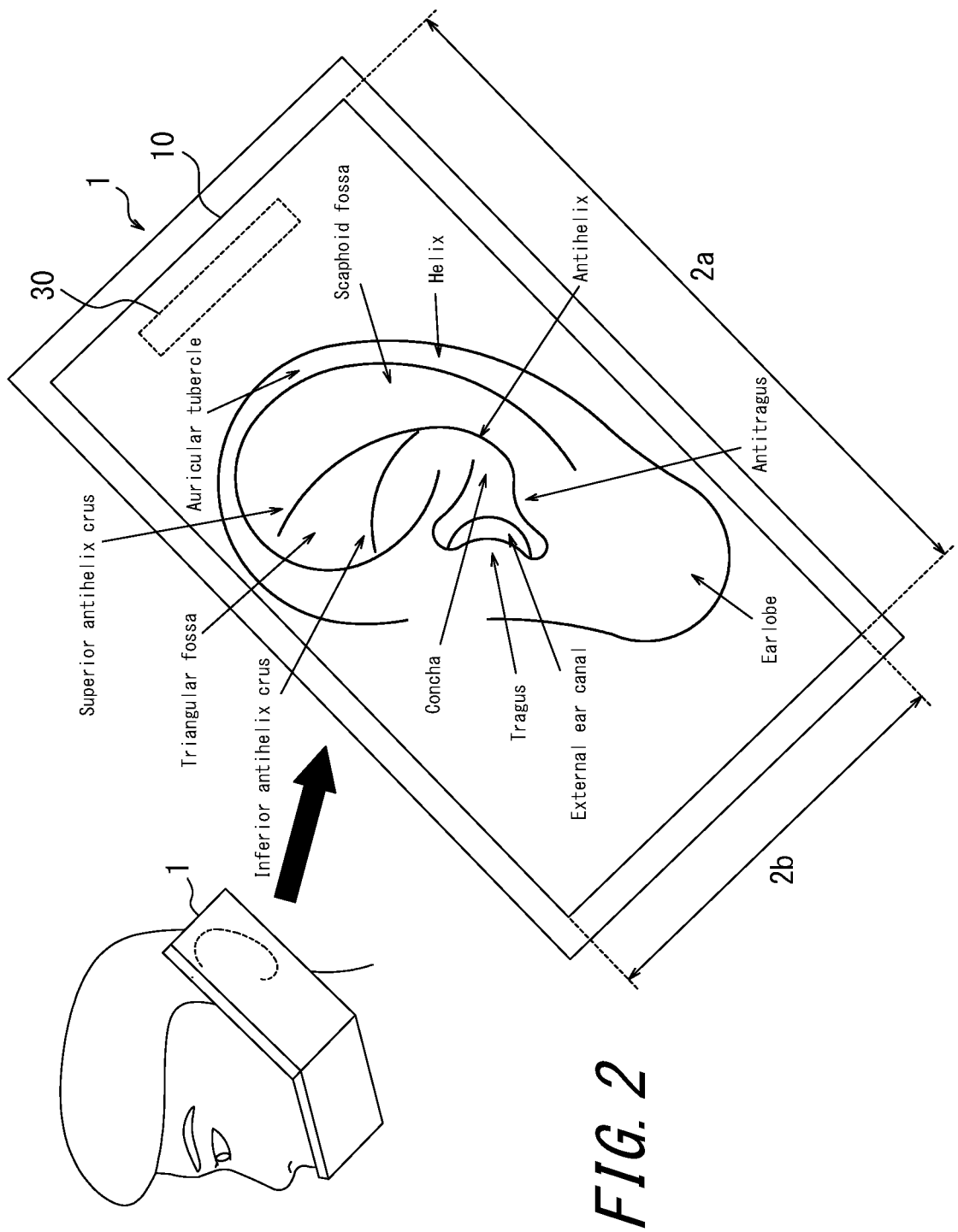
FIG. 2 illustrates an appropriate configuration of a panel.

The panel 10 may be nearly the same size as the user's ear. As illustrated in FIG. 2, the panel 10 may also be larger than the user's ear. Adopting such a size makes it easier for the panel 10 of the electronic device 1 to cover the entire ear when the user listens to sound, thus making it difficult for surrounding sounds (noise) to enter the external ear canal. The region of the panel 10 that vibrates should be larger than a region having a length corresponding to the distance from the inferior antihelix crus to the antitragus and a width corresponding to the distance from the tragus to the antihelix. The region of the panel 10 that vibrates preferably has a length corresponding to the distance from a position in the helix near the superior antihelix crus to the earlobe and a width corresponding to the distance from the tragus to a position in the helix near the antihelix. In this example, the direction of length is a longitudinal direction 2a in which the panel 10 extends. Along this direction, the vibration generator 30 is disposed toward one end from the center of the panel 10. The direction of width is a direction 2b orthogonal to the longitudinal direction. The region with such a length and width may be a rectangular region or may be an elliptical region with the above length as the major axis and the above width as the minor axis. The average size of a Japanese person's ear can be looked up in sources such as the Japanese Body Dimension Data (1992-1994) gathered by the Research Institute of Human Engineering for Quality Life (HQL). Note that if the panel 10 is at least as large as the average size of a Japanese person's ear, it is thought that the panel 10 will be a size capable of covering the entire ear of most non-Japanese people.

With the above-described dimensions and shape, the panel 10 can cover the user's ear and has tolerance for misalignment when placed against the ear.

By vibration of the panel 10, the electronic device 1 can transmit vibration sound through a part of the user's body (such as the cartilage of the outer ear) and air-conducted sound to the user. Therefore, when sound is output at a volume equivalent to a known dynamic receiver, the sound that is transmitted to the periphery of the electronic device 1 by air vibrations due to vibration of the panel 10 is smaller than with a dynamic receiver. Accordingly, the electronic device 1 is appropriate for listening to recorded messages, for example, on the train or the like.

The electronic device 1 transmits vibration sound by vibration of the panel 10, and therefore even if the user is wearing earphones or headphones, for example, the user can hear sound through the earphones or headphones and through a part of the body by contacting the electronic device 1 against the earphones or headphones.

The electronic device 1 transmits sound to a user by vibration of the panel 10. Therefore, if the electronic device 1 is not provided with a separate dynamic receiver, it is unnecessary to form an opening (sound discharge port) for sound transmission in the housing, thereby simplifying waterproof construction of the electronic device 1. On the other hand, if the electronic device 1 is provided with a dynamic receiver, the sound discharge port should be blocked by a member permeable by gas but not liquid. Gore-Tex® (Gore-Tex is a registered trademark in Japan, other countries, or both) is an example of a member permeable by gas but not liquid.

Figure 3A:
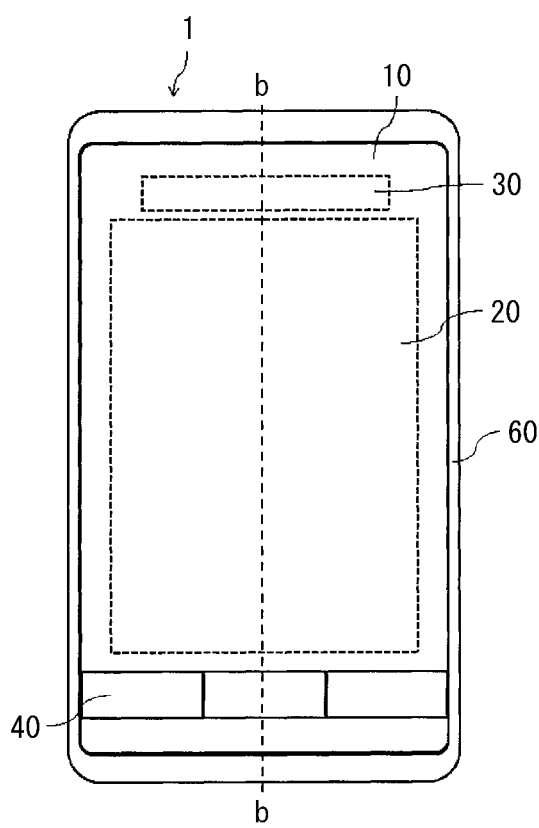
FIGS. 3A and 3B illustrate the basic structure of the electronic device according to Embodiment 1.
Figure 3B:
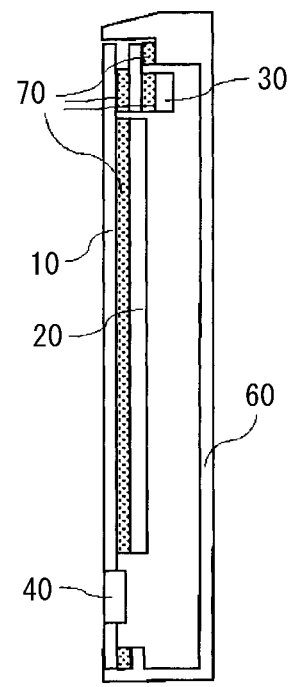

FIGS. 3A and 3B illustrate the basic structure of the electronic device 1 according to one of the embodiments. FIG. 3A is a front view, and FIG. 3B is a cross-sectional view along the b-b line of FIG. 3A. The electronic device 1 illustrated in FIGS. 3A to 3B is a smartphone in which a touch panel that is a glass plate is disposed on the front face of a housing 60 (for example a metal or resin case) as the panel 10. The panel 10 is adhered to the housing 60 by the joining member 70 and held by the housing 60. At the upper side of the electronic device 1, a portion of the panel 10 is attached to the housing 60 via the below-described sheet member. The joining member 70 may, for example, be adhesive or double-sided tape. The input interface 40 is also supported by the housing 60. The display 20 and the vibration generator 30 are attached to the panel 10 by the joining member 70. Examples of the joining member 70 suitable for attaching the vibration generator 30 to the panel 10 include adhesive with thermosetting properties, ultraviolet curable properties, or other such properties; double-sided tape; and the like. The joining member 70 may, for example, be optical elasticity resin, which is clear and colorless acrylic ultraviolet curing adhesive. The panel 10, display 20, and vibration generator 30 are each generally rectangular.

The display 20 is disposed in approximately the center in the transverse direction of the panel 10. The vibration generator 30 is disposed at a predetermined distance from an edge of the panel 10 in the longitudinal direction, near the edge so that the longitudinal direction of the vibration generator 30 extends along the short sides of the panel 10. The display 20 and the vibration generator 30 are disposed side by side, in parallel directions, on the inner face of the panel 10.

By the electronic device 1 of this embodiment having the above-described structure, the panel 10 deforms due to deformation of the vibration generator 30 attached to the back face of the panel 10, allowing air-conducted sound and vibration sound to be transmitted to an object contacting the panel 10 that deforms.

Figure 4:
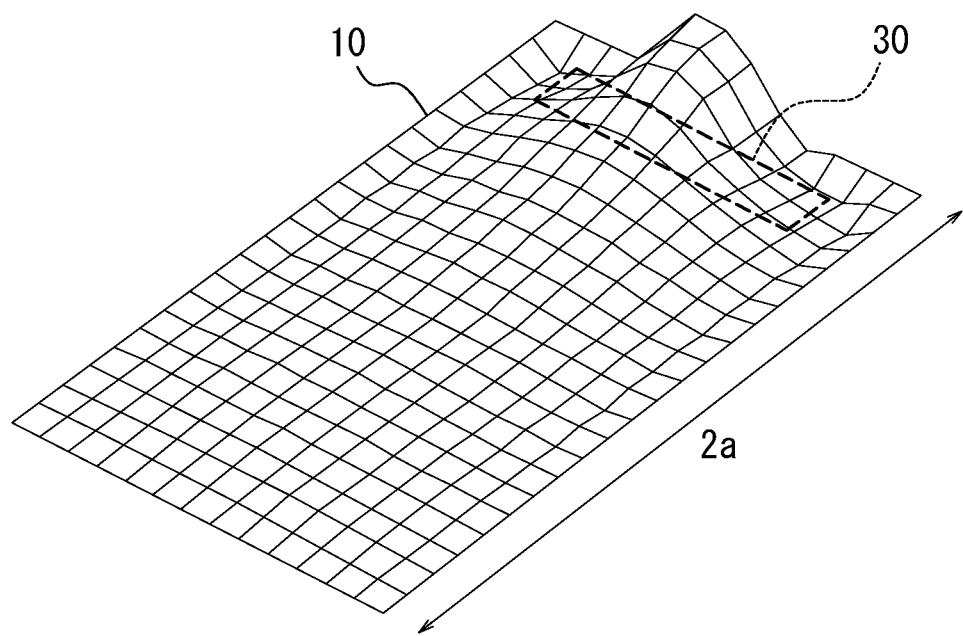
FIG. 4 illustrates an example of vibration of the panel in the electronic device according to Embodiment 1.

FIG. 4 illustrates an example of vibration of the panel 10 in the electronic device 1 according to one of the embodiments. In the electronic device 1 according to this embodiment, the display 20 is attached to the panel 10, and the display 20 is attached below the upper part. Therefore, it is more difficult for the lower part of the panel 10 to vibrate as compared to the upper part of the panel 10 where the vibration generator 30 is attached. In other words, the upper part of the panel 10 is bent directly by the vibration generator 30, and hence vibration is damped at the lower part as compared to the upper part. The panel 10 is bent by the vibration generator 30 so that in the direction 2a of the long sides, the portion of the panel 10 immediately above the vibration generator 30 rises the highest as compared to adjacent portions. Accordingly, the vibration generated by the vibration generator 30 can be damped in the longitudinal direction 2a of the panel 10. As a result, at the lower part of the panel 10, sound leakage due to vibration of the lower part of the panel 10 can be reduced.

The electronic device 1 transmits sound to an object by vibration of the panel 10. If the vibration generator 30 were to be attached to the housing 60 to vibrate the housing 60, then when holding the electronic device in the hand for a phone call, the user might drop the electronic device due to vibration of the housing 60 (the user normally talks on the phone by holding the housing portion of the electronic device). By contrast, such a problem does not tend to occur with the electronic device 1 in which the panel 10 vibrates. When the vibration is not significantly large, the vibration generator 30 may be attached to the housing 60.

In the electronic device 1 according to Embodiment 1, further improvement in sound pressure characteristics is desired. Therefore, the applicant examined a structure of the electronic device 1 that allows further improvement in sound pressure characteristics. The following is a detailed description of the structure of the electronic device 1 that was examined.

Figure 5:
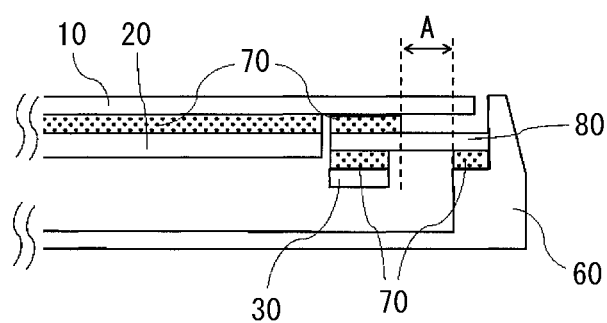
FIG. 5 is a cross-sectional diagram illustrating the detailed structure of the electronic device according to Embodiment 1.

FIG. 5 is a cross-sectional diagram illustrating the detailed structure of the electronic device 1 according to one of the embodiments. In the electronic device 1, a sheet member 80 is provided between the housing 60 and the panel 10. A first portion of the sheet member 80 is joined to the panel 10, and a second portion of the sheet member 80 differing from the first portion is joined to the housing 60. In greater detail, a first end of the sheet member 80 is attached to the panel 10 via the joining member 70, and a second end at the opposite side from the first end in the extending direction of the sheet member 80 is attached to the housing 60 via the joining member 70. On the surface of the sheet member 80 opposite the surface joined to the panel 10, the vibration generator 30 is attached via the joining member 70. This structure illustrates the case of both ends of the sheet member 80 being attached to either the panel 10 or the housing 60, but the areas that are attached do not need to be the ends. This disclosure may also be applied when attaching, to the panel 10 or the housing 60, a predetermined area that is separated from the end by a predetermined distance. The same is true for the below-described modifications as well.

The sheet member 80 may, for example, be a polyethylene terephthalate (PET) film or an acrylic film having a thickness of approximately 0.05 mm. Such a sheet member 80 is easily deformed by an external force. For example, when an external force is applied in the thickness direction of the sheet member 80, deflection occurs in the direction of the external force.

In addition to PET film or an acrylic film, the sheet member 80 may be a film made of, for example, an elastic material such as rubber or silicone; polyamide resin; or the above-described Gore-Tex®. Examples of a polyamide resin include Reny® (Reny is a registered trademark in Japan, other countries, or both), which is formed from crystalline thermoplastic resin obtained from m-Xylylenediamine and adipic acid and has excellent strength and elasticity. Such a polyamide resin may be used as a base polymer and be reinforced by glass fiber, metallic fiber, carbon fiber, or the like to yield a reinforced resin. The strength and elasticity may be appropriately adjusted in accordance with the amount of glass fiber, metallic fiber, carbon fiber, or the like added to the polyamide resin. The above-described reinforced resin may, for example, be formed by interweaving glass fiber, metallic fiber, carbon fiber, or the like into a substrate, impregnating the substrate with resin, and allowing the resin to harden. The reinforced resin also may be formed by mixing finely cut fibers into liquid resin and then allowing the resin to harden. The reinforced resin may also be a laminate of a substrate with interwoven fiber and a resin layer. The sheet member 80 may be a metal plate made of iron, stainless steel (an alloy of iron and chromium), aluminum, or the like that is widely used as a component in precision instruments.

Between an area of the sheet member 80 joined to the panel 10 and an area of the sheet member 80 joined to the housing 60, the sheet member 80 includes an area A to which neither the panel 10 nor the housing 60 is attached. In FIG. 5, the area A corresponds to the width indicated by the double-headed arrow. The area A in the sheet member 80 is an area in which the sheet member 80 can deform (for example, by deflection). Accordingly, the area A in the sheet member 80 can deform along with deformation of the panel 10. Below, the area A is referred to as a deformation area A.

Figure 6:
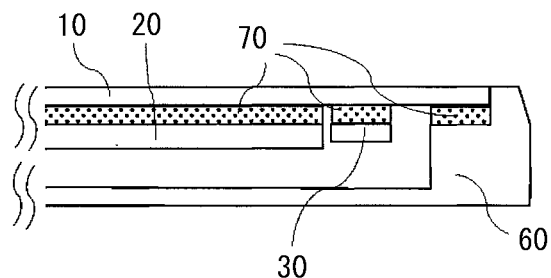
FIG. 6 illustrates a conventional structure of an electronic device in which a vibration generator is attached to the panel.

The sheet member 80 is disposed so that the deformation area A of the sheet member 80 is roughly parallel to the panel 10. Accordingly, the deformation area A undergoes deflection in a direction roughly parallel to the vibration (deformation) direction of the panel 10 (the panel 10 deforms in a direction perpendicular to the principal surface of the panel 10). FIG. 6 illustrates a conventional structure of an electronic device in which the vibration generator 30 is attached to the panel. In this conventional structure, no sheet member 80 is provided between the housing 60 and the panel 10, and the housing 60 and panel 10 are joined in the lamination direction thereof via the joining member 70. The lamination direction of the housing 60 and the panel 10 is roughly the same direction as the direction in which the panel 10 vibrates (deforms) due to deformation of the vibration generator 30. Accordingly, deformation of the panel 10 is inhibited by the housing 60 and the panel 10 being joined. Conversely, in the electronic device 1 of this disclosure in which the sheet member 80 is provided, the deformation area A of the sheet member 80 undergoes deflection along with deformation of the panel 10 when the panel 10 deforms. Therefore, deformation of the panel 10 is not easily inhibited. As a result, as compared to a conventional electronic device, the electronic device 1 of this disclosure achieves higher sound pressure characteristics due to deformation of the panel 10 not being easily inhibited. The sheet member 80 is flexible enough not to undergo fatigue failure even when repeatedly deforming by following vibration of the panel 10.

The vibration generator 30 is attached to the surface of the sheet member 80 opposite the surface that is attached to the panel 10. In plan view of the panel 10, the area of the sheet member 80 attached to the panel 10 at least overlaps the area of the sheet member 80 where the vibration generator 30 is attached. In other words, the panel 10, the sheet member 80, and the vibration generator 30 are stacked, with the joining member 70 therebetween, in the flexure direction of the vibration generator 30 (the direction of vibration of the panel 10, i.e. the direction perpendicular to the principal surface of the panel 10). Due to such a structure, the force generated by deformation (displacement) of the vibration generator 30 efficiently propagates to the panel 10. As a result, the sound pressure characteristics of the electronic device 1 are improved.

In an electronic device such as the disclosed electronic device 1 in which the vibration generator 30 is attached to the panel 10, it is clear that the panel 10 is bent by the vibration generator 30 so that in the direction of the long sides, the portion of the panel 10 immediately above the vibration generator 30 rises the highest as compared to adjacent portions, as described above. In other words, the force generated by deformation of the vibration generator 30 most easily propagates to a location in the panel 10 immediately above the vibration generator 30. Accordingly, to improve the sound pressure characteristics, it is important that vibration at a location in the panel 10 immediately above the vibration generator 30 and in nearby areas not be easily inhibited. Therefore, in this disclosure, a structure in which the deformation area A of the sheet member 80 is provided near the vibration generator 30 is preferred. On the other hand, as described above, propagation of the force generated by deformation of the vibration generator 30 is preferably not mitigated by the deformation area A. Therefore, placing the deformation area A of the sheet member 80 immediately above the vibration generator 30 should be avoided. Based on these considerations, in the electronic device 1 of this disclosure, the deformation area A (the area in which neither the housing 60 nor the panel 10 is attached) is most preferably formed adjacent to the area of the sheet member 80 where the panel 10 is attached, or to the area of the sheet member 80 where the vibration generator 30 is attached.

Thus far, PET film, acrylic film, and the like have been illustrated as examples of the sheet member 80, but the materials used in the sheet member 80 are not limited to these examples. For example, the material used in the sheet member 80 may be double-sided tape for joining the members in the electronic device 1. In this case, this disclosure is implemented by adopting a structure that includes the deformation area A, to which neither the housing 60 nor the panel 10 is attached, between the area joined to the housing 60 and the area joined to the panel 10.

Figure 7:
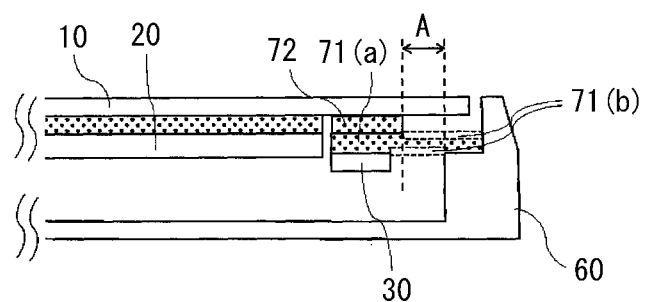
FIG. 7 is a cross-sectional diagram illustrating the structure of this disclosure when using double-sided tape as the sheet member.

FIG. 7 is a cross-sectional diagram illustrating the structure of this disclosure when using double-sided tape as the sheet member 80. In this structure, two pieces of double-sided tape with different lengths (first double-sided tape 71 as the sheet member 80 and second double-sided tape 72 for attaching the first double-sided tape 71 to the panel 10) are overlaid inside the electronic device 1. A first portion of the first double-sided tape 71 is joined to the panel 10, and a second portion of the first double-sided tape 71 differing from the first portion is joined to the housing 60. In greater detail, a first end of the first double-sided tape 71 is attached to the panel 10 via the second double-sided tape 72, and a second end at the opposite side from the first end in the extending direction of the first double-sided tape 71 is attached to the housing 60. The vibration generator 30 is attached to the surface of the first double-sided tape 71 opposite the surface that is attached to the panel 10. In this structure, since the double-sided tape 71, 72 is used as the sheet member 80, the joining member 70 need not be provided separately to attach the vibration generator 30 to the double-sided tape 71, 72. Accordingly, as compared to when using PET film or acrylic film as the sheet member 80, the structure of the electronic device 1 can be simplified. Furthermore, in this structure, the second double-sided tape 72 exists between the first double-sided tape 71 and the panel 10. Therefore, the first double-sided tape 71 and the panel 10 are separated by a width equal to the thickness of the second double-sided tape 72. This separation distance is sufficiently larger than the maximum vibration width when the panel 10 vibrates. Therefore, the vibrating panel 10 can be prevented from contacting the first double-sided tape 71.

The first double-sided tape 71 includes the deformation area A, to which neither the panel 10 nor the housing 60 is attached, between the area joined to the panel 10 and the area joined to the housing 60. The first double-sided tape 71 for example has a structure with a PET film substrate, the upper and lower surfaces of which are covered by a pressure sensitive adhesive. The first double-sided tape 71 easily deforms upon application of an external force. Accordingly, when the panel 10 deforms, the deformation area A of the first double-sided tape 71 deforms along with deformation of the panel 10. Therefore, deformation of the panel 10 is not easily inhibited, thus improving the sound pressure characteristics.

The first double-sided tape 71 may, for example, have a three-layered structure in which the upper and lower surfaces of a PET film substrate are covered by a pressure sensitive adhesive. With such double-sided tape, it is possible to form a non-adhesive area that is not covered by pressure sensitive adhesive in the double-sided tape, and the size of the non-adhesive area can be freely changed. Therefore, in this structure, the areas of the first double-sided tape 71 other than the areas to which the panel 10, housing 60, and vibration generator 30 are attached may be configured as non-adhesive areas (in FIG. 7, the first double-sided tape 71 is shown with non-adhesive areas 71(*b*) and other areas 71(*a*)). By adopting such a structure, when the deformation area A of the first double-sided tape 71 undergoes deflection along with deformation of the panel 10, portions of the deformation area A can be prevented from touching and adhering to each other.

The structure of the first double-sided tape 71 is not limited to the above-described structure. For example, in addition to PET film, an acrylic film or the like may be used as the substrate sandwiched between pressure sensitive adhesive. Foam or a non-woven fabric film may also be used. Double-sided tape made of foam is, for example, double-sided tape in which an acrylic pressure sensitive adhesive is laminated onto the upper and lower surfaces of a polyethylene substrate having a structure with minute air bubbles. Provision of the non-adhesive area 71(*b*) in the first double-sided tape 71 is not essential.

In the above-described structure according to this disclosure (FIG. 7), two pieces of double-sided tape, i.e. the first double-sided tape 71 and the second double-sided tape 72, are used in overlap, but such a structure does not need to be adopted. A structure in which the first double-sided tape 71 is attached to the panel 10 as the sheet member 80 without including the second double-sided tape 72 therebetween, i.e. a structure in which only the first double-sided tape 71 is provided, may be adopted. In such a case, as compared to when two pieces of double-sided tape are used in overlap, the configuration of double-sided tape inside the electronic device 1 can be simplified. Furthermore, by providing the non-adhesive area 71(*b*) in the first double-sided tape 71, the deformation area A to which neither the panel 10 nor the housing 60 is attached can be formed, thus achieving an electronic device with improved sound pressure characteristics as contemplated in this disclosure.

FIG. 8 illustrates frequency characteristics of the electronic device according to one of the disclosed embodiments. FIG. 8 illustrates frequency characteristics 91 for an electronic device in which PET film is disposed as the sheet member 80 between the housing 60 and the panel 10 (corresponding to FIG. 5), frequency characteristics 92 for an electronic device in which first double-sided tape 71 is disposed as the sheet member 80 (corresponding to FIG. 7), and frequency characteristics 93 for a conventional electronic device (not including the sheet member 80, corresponding to FIG. 6). The horizontal axis represents the frequency of output audio, and the vertical axis represents sound pressure.

In an electronic device in which a vibration generator is attached to the panel, improvement of sound pressure in a low frequency band, such as 300 Hz to 1 kHz, among the frequency bands used for a voice call of a mobile phone (300 Hz to 3.4 kHz) has been an issue. In a frequency band of approximately 300 Hz to 2.5 kHz, the frequency characteristics 91 and 92 in the electronic device 1 according to this disclosure exhibit sound pressure that is 1 dB to 5 dB higher than the frequency characteristics 93 of the conventional electronic device, thus demonstrating improvement of the conventionally problematic sound pressure in the low frequency band. The reason is that the electronic device 1 according to this disclosure has a structure in which deformation of the panel 10 is not easily inhibited. Furthermore, since there is almost no difference between the frequency characteristics 91 and the frequency characteristics 92, it follows that the material of the sheet member 80 (PET film or double-sided tape) has almost no effect on the sound pressure characteristics. Therefore, any material that is a flexible film may be used.

The above-described embodiment of this disclosure illustrates an example in which a roughly planar sheet member 80 is provided as a member capable of deflection, but the sheet member 80 is not limited to a planar shape.

Figure 9A:
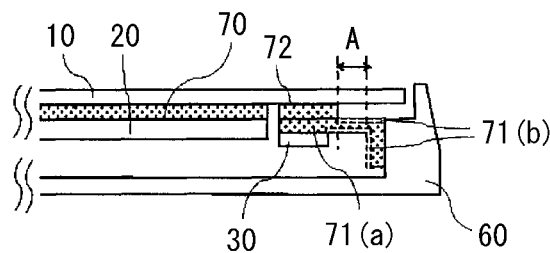
FIGS. 9A, 9B, and 9C are cross-sectional diagrams respectively illustrating modifications to the structure of Embodiment 1.
Figure 9B:
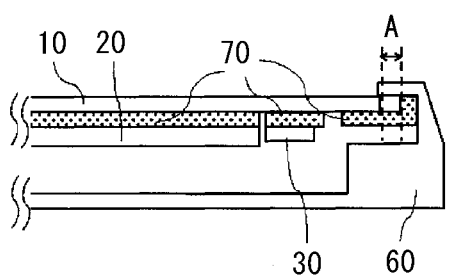
Figure 9C:
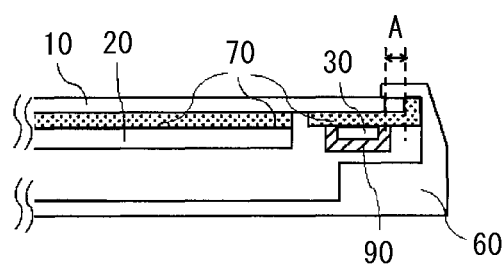

FIGS. 9A, 9B, and 9C are cross-sectional diagrams respectively illustrating modifications to the structure of this disclosure. These modifications are examples in which double-sided tape 70 (or 71) with an approximate L-shape is provided inside the electronic device 1 as the sheet member 80. The double-sided tape 70, 71 has a shape that is bent roughly perpendicularly so as to have a surface parallel to the panel 10 and a surface parallel to the housing 60 of the electronic device 1. A portion of the surface of the double-sided tape 70, 71 parallel to the panel 10 is joined to the panel 10, whereas the surface parallel to the upper side of the electronic device 1 is joined to the housing 60. On the surface of the double-sided tape 70, 71 parallel to the panel 10, the deformation area A that is not attached to either the panel 10 or the housing 60 is formed. The deformation area A is formed between the area joined to the panel 10 and the area joined to the housing 60 in the double-sided tape 70, 71. When the panel 10 deforms, the deformation area A of the double-sided tape 70, 71 deforms along with deformation of the panel 10. Therefore, deformation of the panel 10 is not easily inhibited, thus improving the sound pressure characteristics. The double-sided tape 70, 71 is disposed so that, at this time, the deformation area A is roughly parallel to the panel 10. Accordingly, the deformation area A undergoes deflection in a direction roughly parallel to the vibration (deformation) direction of the panel 10.

In the structure illustrated in FIG. 9A, two pieces of double-sided tape are used, i.e. first double-sided tape 71 and second double-sided tape 72. The first double-sided tape 71 has a shape that is bent roughly perpendicularly towards the back face of the electronic device 1 in continuation from the edge of the surface that is parallel to the panel 10. The vibration generator 30 is attached to the surface of the first double-sided tape 71 opposite the surface that is attached to the panel 10. The areas of the first double-sided tape 71 other than the areas to which the panel 10, housing 60, and vibration generator 30 are attached are non-adhesive areas 71B.

FIG. 9B illustrates a structure in which, for reasons such as improvement in the impact resistance of the electronic device 1, the edges of the panel 10 are covered by a bezel provided continuously with the housing 60. In this structure, the double-sided tape 70 provided as the sheet member 80 has an approximate L-shape with a surface parallel to the panel 10 and a surface parallel to the upper side of the electronic device 1. In the double-sided tape 70, the surface parallel to the upper side of the electronic device 1 is attached to the housing 60 along the bezel of the housing 60. The surface parallel to the panel 10 in the double-sided tape 70 extends farther outward than the panel 10. This area of extension is not joined to the housing 60 and is therefore an area capable of deformation (deformation area A). In this structure, the deformation area A is not covered by the panel 10 but is covered by the bezel of the housing 60. Therefore, the double-sided tape 70 is not visibly exposed. As in the structure in FIG. 9A, a non-adhesive area 71(*b*) may be provided in the double-sided tape 70 as appropriate in this structure as well.

The structure in FIG. 9C illustrates the case of the double-sided tape provided as the sheet member 80 and the double-sided tape for attaching the vibration generator 30 being integrated in the structure in FIG. 9B. In this case, as compared to the structure in FIG. 9B, the configuration of double-sided tape in the electronic device 1 is simplified. For example, the vibration generator 30 can be placed at a position closer to the upper side of the housing 60, thereby enlarging the area in which the display 20 can be placed. When the vibration generator 30 is provided at a position close to the upper side of the housing 60, another member constituting the upper side of the housing 60 may come close to the vibration generator 30. When the electronic device 1 has such a structure, the impact upon the electronic device 1 being dropped, for example, might cause the vibration generator 30 and another member inside the housing 60, such as a projecting corner or an electrical component, to come into contact, and the vibration generator 30 might be damaged. Accordingly, the vibration generator 30 may be covered by a buffer member 90 formed from rubber mold material or the like to yield a structure that can absorb an external force so as to mitigate the propagation of shock to the vibration generator 30. FIG. 9C illustrates a structure in which the buffer member 90 covers surfaces of the vibration generator 30 other than the surface attached to the panel 10. The shape of the buffer member 90 is not, however, limited to this example and may be a plate-like shape attached to the surface of the vibration generator 30 opposite from the surface attached to the panel 10. Ultraviolet curable resin or the like may be dripped onto the surface of the vibration generator 30 opposite from the surface attached to the panel 10 and hardened so as to form the buffer member 90.

Figure 10A:
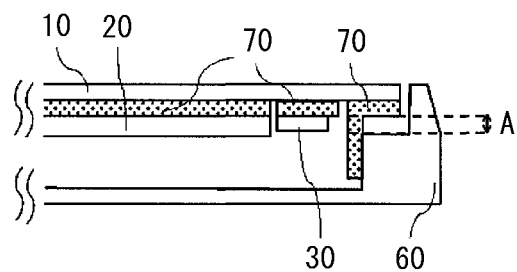
FIGS. 10A and 10B are cross-sectional diagrams respectively illustrating further modifications to the structure of Embodiment 1.
Figure 10B:
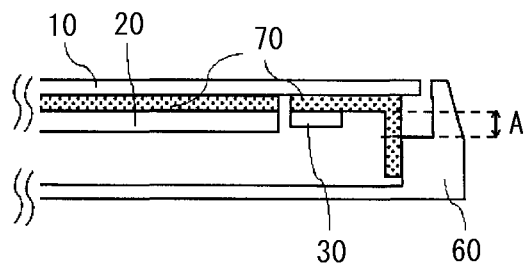

FIGS. 10A and 10B are cross-sectional diagrams respectively illustrating further modifications to the structure of this disclosure. These modifications represent the case of modifying the structure in FIGS. 9A to 9C so that the direction of deformation of the deformation area A in the double-sided tape 70 provided as the sheet member 80 is roughly perpendicular to the direction of vibration (deformation) of the panel 10. In these modifications, the double-sided tape 70 provided as the sheet member 80 has an approximate L-shape with a surface parallel to the panel 10 and a surface parallel to the upper side of the electronic device 1. The surface of the double-sided tape 70 parallel to the panel 10 is joined to the panel 10. A portion of the surface parallel to the upper side of the electronic device 1 is joined to the housing 60. The deformation area A, to which neither the panel 10 nor the housing 60 is attached, is formed on the surface of the double-sided tape 70 parallel to the upper side of the electronic device 1. The deformation area A is formed between the area joined to the panel 10 and the area joined to the housing 60 in the double-sided tape 70. When the panel 10 deforms, the deformation area A of the double-sided tape 70 deforms along with deformation of the panel 10. Therefore, deformation of the panel 10 is not easily inhibited, thus improving the sound pressure characteristics. The double-sided tape 70 is disposed so that, at this time, the deformation area A is roughly perpendicular to the panel 10. Accordingly, the deformation area A undergoes deflection in a direction roughly perpendicular to the vibration (deformation) direction of the panel 10.

In this disclosure, the sheet member 80 can be disposed so that the deformation area A of the sheet member 80 is either in a direction parallel to or a direction perpendicular to the direction of deformation (vibration) of the panel 10. In other words, the direction in which the deformation area A is disposed is not limited in this disclosure. Accordingly, the degree of freedom for placement of the sheet member 80 inside the electronic device 1 is high.

In the structure illustrated in FIG. 10A, the double-sided tape 70 provided as the sheet member 80 and double-sided tape for attaching the vibration generator 30 are provided separately. By adopting such a structure, propagation of the force generated by deformation of the vibration generator 30 is not mitigated by the deformation area A of the double-sided tape 70.

The structure in FIG. 10B illustrates the case of the double-sided tape 70 provided as the sheet member 80 and the double-sided tape for attaching the vibration generator 30 being integrated. In this case, as compared to when the double-sided tape 70 provided as the sheet member 80 and the double-sided tape for attaching the vibration generator 30 are provided separately, the configuration of double-sided tape in the electronic device 1 is simplified.

Figure 11A:
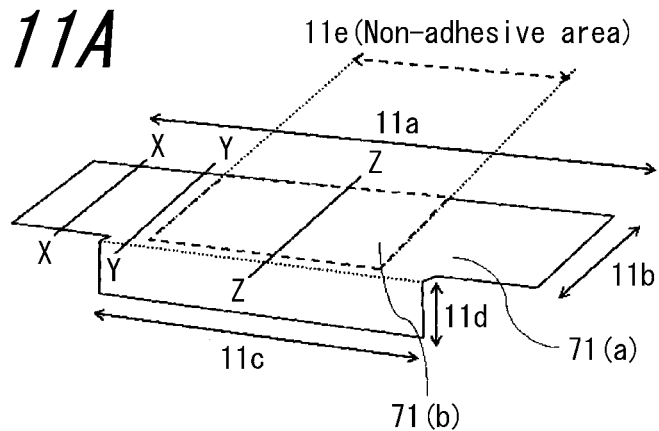
FIGS. 11A, 11B, 11C, and 11D illustrate the cross-sectional structure at different positions in the direction of the short sides of the principal surface of the electronic device.

FIGS. 11A, 11B, 11C, and 11D illustrate the cross-sectional structure at different positions in the direction of the short sides of the principal surface of the electronic device 1. FIG. 11A illustrates a sheet member 80 (double-sided tape 71) with an approximate L-shape provided inside the electronic device 1. The double-sided tape 71 illustrated in FIG. 11A for example has the same structure as that illustrated in FIG. 10A and includes a surface attached to the panel 10 and a surface attached to the housing 60. The surface attached to the panel 10 is a generally rectangular surface having sides 11a parallel to the short sides of the panel 10 (i.e. the short sides of the principal surface of the electronic device 1) and sides 11b parallel to the long sides of the panel 10 (i.e. the long sides of the principal surface of the electronic device 1). The surface attached to the housing 60 is a generally rectangular surface having sides 11c parallel to the short sides of the principal surface of the electronic device 1 and sides 11d parallel to the thickness direction of the electronic device 1. The length of the sides 11c on the surface attached to the housing 60 is shorter than the length of the sides 11a on the surface attached to the panel 10. At the surface attached to the panel 10, a non-adhesive area 71(b) having a shorter width than the sides 11c of the surface attached to the housing 60 is formed. The non-adhesive area 71(b) is formed on the surface opposite from the surface attached to the panel 10. Accordingly, this area is not joined to the housing 60.

Figure 11B:
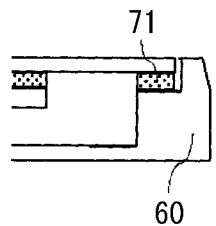

FIG. 11B is a cross-sectional view along the X-X line in FIG. 11A. FIG. 11B illustrates not only the double-sided tape 71 but also the members forming the electronic device 1. In FIG. 11B, the surface of the double-sided tape 71 parallel to the panel 10 is attached to the panel 10, whereas the surface opposite from the surface attached to the panel 10 is attached to the housing 60.

Figure 11C:
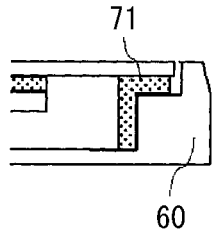

FIG. 11C is a cross-sectional diagram along the Y-Y line in FIG. 11A (illustrating not only the double-sided tape 71, but also the members forming the electronic device 1). In FIG. 11C, the surface of the double-sided tape 71 parallel to the panel 10 is attached to the panel 10, whereas the surface opposite from the surface attached to the panel 10 is attached to the housing 60. Furthermore, the surface that extends in parallel to the upper side of the electronic device 1 is also attached to the housing 60. This surface is bent from the surface parallel to the panel 10. In this case, the panel 10 and the housing 60 can be attached more strongly than with the structure illustrated in FIG. 11B (X-X cross section).

Figure 11D:
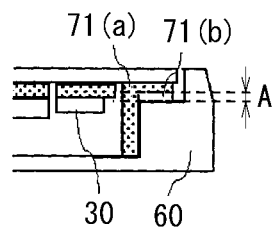

FIG. 11D is a cross-sectional diagram along the Z-Z line in FIG. 11A (illustrating not only the double-sided tape 71, but also the members forming the electronic device 1). In FIG. 11D, the surface of the double-sided tape 71 parallel to the panel 10 is attached to the panel 10, but the surface opposite from the surface attached to the panel 10 is a non-adhesive area 71(b) and therefore is not attached to the housing 60. On the other hand, the surface that extends in parallel to the upper side of the electronic device 1 and is bent from the surface parallel to the panel 10 is attached to the housing 60. The surface of the double-sided tape 71 parallel to the upper side of the electronic device 1 is not attached to the housing 60 across the entire area thereof. Rather, an area corresponding to the thickness of a non-adhesive layer in the non-adhesive area 71(b) of the double-sided tape 71 is not attached to the housing 60. The non-adhesive layer is the layer that would be formed by pressure sensitive adhesive if the intermediate layer of the double-sided tape 71 were covered with pressure sensitive adhesive, and the thickness of the non-adhesive layer indicates the thickness of the layer that would be formed by pressure sensitive adhesive. In the cross-section along the Z-Z line, as compared to the cross-section along the Y-Y line, the surface of the double-sided tape 71 opposite from the surface attached to the panel 10 is not covered by pressure sensitive adhesive. Therefore, the double-sided tape 71 is reduced in thickness by an amount equaling the thickness of the layer formed by pressure sensitive adhesive. Accordingly, in the cross-section along the Z-Z line, the double-sided tape 71 is not covered by pressure sensitive adhesive and is separated from the housing 60 by an amount equal to the reduction in thickness of the double-sided tape 71. The width A separating the double-sided tape 71 from the housing 60 corresponds to the width of the area not attached to the housing 60 along the surface of the double-sided tape 71 parallel to the upper side of the electronic device 1. This area, i.e. the deformation area A, deforms along with deformation of the panel 10 when the panel 10 deforms. Therefore, deformation of the panel 10 is not easily inhibited, thus improving the sound pressure characteristics.

As described above, in the cross-sectional structure of the electronic device 1, the structure of the double-sided tape 71 has at least three patterns (FIGS. 11B to 11D). The area occupied by these three structures, i.e. the cross-sectional structures along the X-X line, Y-Y line, and Z-Z line, in the direction of the short sides of the principal surface of the electronic device 1 may be adjusted appropriately by changing the shape of the double-sided tape 71. For example, by changing the width of the sides 11c with respect to the sides 11a, the fixation strength between the panel 10 and the housing 60 due to the double-sided tape 71 can be adjusted. Furthermore, the sound pressure characteristics can be improved by increasing the width of the sides 11e with respect to the sides 11a (the width of the deformation area A in the direction of the short sides of the principal surface of the electronic device 1), i.e. by increasing the width of the non-adhesive area.

In the electronic device 1 according to this disclosure, if the strength of fixation to the housing 60 at the right and left ends of the panel 10 (the ends along the short sides of the panel 10) is low, the right and left ends of the panel 10 vibrate greatly. At that time, depending on the frequency of the drive signal, the right and left ends of the panel 10 may vibrate at the opposite phase from vibration of the vibration generator 30, leading to a reduction in the sound pressure characteristics of the electronic device 1. Accordingly, in this disclosure, the panel 10 and the housing 60 are preferably fixed firmly by the double-sided tape 71 at the right and left ends of the panel 10, and the deformation area A is preferably formed by providing the non-adhesive area 71(b) in the double-sided tape 71 in an area other than the right and left ends. The width of the deformation area A in the double-sided tape 71 provided as the sheet member 80 can, as described above, be changed in the direction of the short sides of the panel 10. Therefore, appropriately adjusting this width allows both improvement in the sound pressure characteristics due to provision of the deformation area A and improvement in the sound pressure characteristics due to fixation to the housing 60 by not providing the deformation area A at the right and left ends of the panel 10. In order to fix the right and left ends of the panel 10 to the housing 60 more firmly, for example adhesive with a higher adhesive strength than the double-sided tape 71 may be applied onto the double-sided tape 71, so that the right and left ends of the panel 10 are fixed by this adhesive. Instead of applying adhesive onto the double-sided tape 71, a portion of the double-sided tape 71 may be gouged out and the resulting space filled with adhesive in order to fix the panel 10 and the housing 60 together. Examples of the adhesive used in this case include non-heat hardening adhesive and moisture-curable elastic adhesive that reacts with moisture (humidity) in the air. The primary component in a moisture-curable elastic adhesive is, for example, a special polymer that includes a silyl group.

Figure 12:
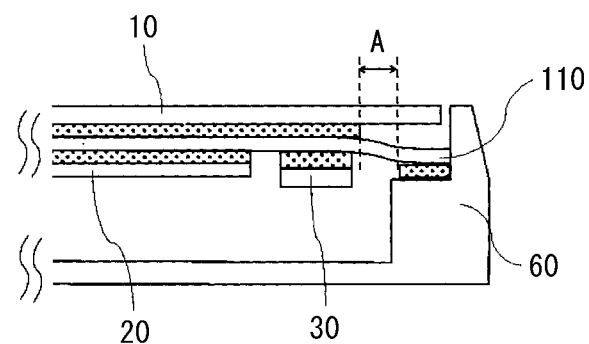
FIG. 12 is a cross-sectional diagram illustrating the structure of this disclosure when using an anti-scattering sheet as the sheet member.

FIG. 12 is a cross-sectional diagram illustrating the structure of this disclosure when using an anti-scattering sheet 110 as the sheet member 80. The anti-scattering sheet 110 is a member provided in order to prevent scattering of glass panel fragments due to a shock received by the electronic device 1. Via clear and colorless adhesive or the like, the anti-scattering sheet 110 is attached to a surface of the panel 10 on the inside of the electronic device 1. Via clear and colorless adhesive or the like, the display 20 is attached to the surface of the anti-scattering sheet opposite the surface attached to the panel 10, and via double-sided tape or the like, the vibration generator 30 is attached to the same surface. Furthermore, an area of the anti-scattering sheet 110 positioned at the upper side of the electronic device 1 is attached to the housing 60 via double-sided tape or the like.

The anti-scattering sheet 110 has an area, at the upper side of the electronic device 1, that is not attached to the panel 10. The anti-scattering sheet 110 has an area, between the area attached to the panel 10 and the area attached to the housing 60, that is not attached to either the panel 10 or the housing 60. That is, the anti-scattering sheet 110 includes the deformation area A. When the panel 10 deforms, the deformation area A deforms along with deformation of the panel 10. Therefore, deformation of the panel 10 is not easily inhibited, thus improving the sound pressure characteristics.

FIG. 12 illustrates the case of using the anti-scattering sheet 110 as the sheet member 80, but a touch panel may be provided instead of the anti-scattering sheet 110. The touch panel may, for example, be provided by forming a transparent conductive layer of indium oxide, tin, or the like on the surface of the plastic film via sputtering. A touch panel uses a flexible plastic film as a substrate and is therefore capable of deflection. Accordingly, a flexible area may be provided in the touch panel, and this area can deform along with deformation of the panel 10.

The explanation thus far has focused on a structure in which the sheet member 80 is provided in an electronic device in which the vibration generator 30 is attached to the panel 10, but this disclosure is not limited to such a structure. For example, this disclosure may be implemented by adopting a structure in which the sheet member 80 is provided in an electronic device in which the vibration generator 30 is attached to the housing 60.

Figure 13:
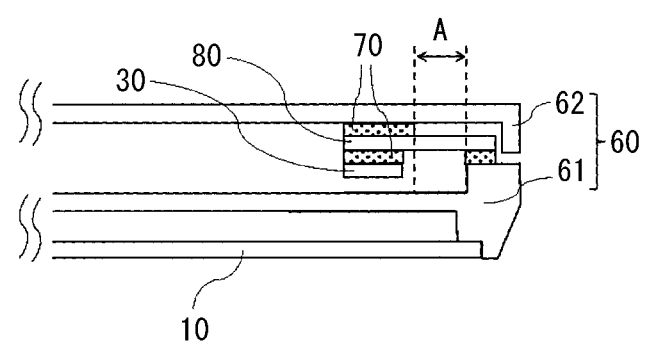
FIG. 13 is a cross-sectional diagram illustrating a structure in which the vibration generator is attached to the housing in Embodiment 1.

FIG. 13 is a cross-sectional diagram illustrating a structure in which the vibration generator 30 is attached to the housing 60 in Embodiment 1. The housing 60 is provided with a rear case (first housing portion) 61 and a cover member (second housing portion) 62 that is detachable from the rear case 61. The cover member 62 may, for example, be a battery cover or the like formed from polycarbonate. The panel 10 is attached to the rear case 61. While not illustrated, the display 20 and the input interface 40 are also attached to the rear case 61. The vibration generator 30 is attached to the surface of the cover member 62 on the inside of the electronic device 1 via the sheet member 80. The cover member 62 to which the vibration generator 30 is attached deforms in conjunction with displacement of the vibration generator 30, causing the cover member 62 to vibrate. Therefore, the cover member 62 generates air-conducted sound. The cover member 62 also transmits human body vibration sound to an object that contacts the cover member 62.

A first portion of the sheet member 80 is joined to the cover member 62 via the joining member 70, and a second portion of the sheet member 80 differing from the first portion is joined to the rear case 61 via the joining member 70. The sheet member 80 includes the deformation area A, to which neither the cover member 62 nor the rear case 61 is attached, between the area of the sheet member 80 attached to the cover member 62 and the area of the sheet member 80 attached to the rear case 61. When the cover member 62 deforms, the deformation area A deforms along with deformation of the cover member 62. Therefore, deformation of the cover member 62 is not easily inhibited, thus improving the sound pressure characteristics.

Although Embodiment 1 has been described based on drawings and examples, it is to be noted that various changes and modifications will be apparent to those skilled in the art based on the present disclosure. Therefore, such changes and modifications are to be understood as included within the scope of this disclosure. For example, on the double-sided tape provided as the sheet member, the non-adhesive area has been described as being provided on a substrate of PET film or the like by not covering an area with pressure sensitive adhesive, but this example is not limiting. The non-adhesive area may also be provided by coating an area where the pressure sensitive adhesive is disposed with a fine powder made of organic material, inorganic material, or an organic-inorganic composite, or by covering this area with a non-adhesive plastic sheet. As modifications to this disclosure, examples have been provided of using double-sided tape as the sheet member, but PET film, acrylic film, or the like may clearly be used instead of double-sided tape. Furthermore, a structure has been illustrated in which the joining member for attaching the display 20 to the panel 10 and the joining member for attaching the vibration generator 30 to the panel 10 are provided separately, but this example is not limiting. These joining members may be disposed in the electronic device 1 as an integral member. A structure has also been described in which double-sided tape is used when joining the sheet member 80 to the panel 10 or the housing 60, but this example is not limiting. Pressure sensitive adhesive, another adhesive material, or the like may be used.

Next, Embodiment 2 is described. An overview of the electronic device 1 of Embodiment 2 is similar to an overview of the above-described electronic device 1 of Embodiment 1.

Figure 14A:
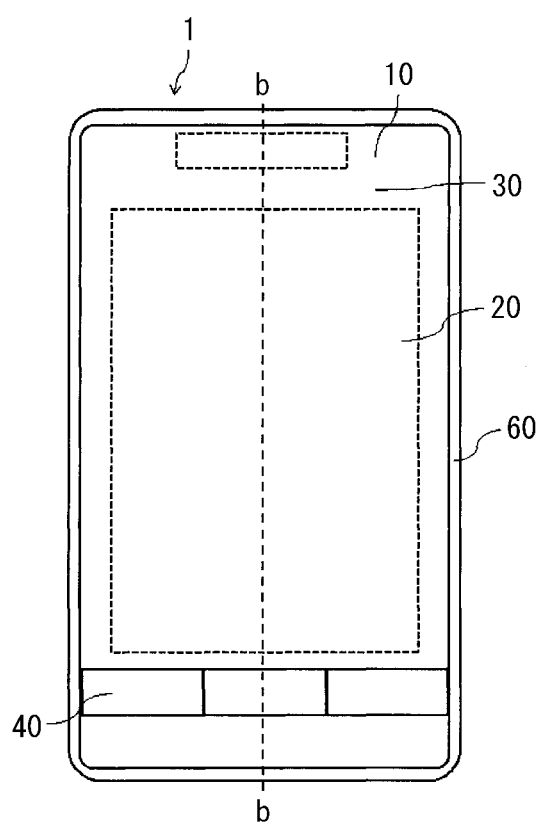
FIGS. 14A and 14B illustrate the basic structure of the electronic device according to Embodiment 2.
Figure 14B:
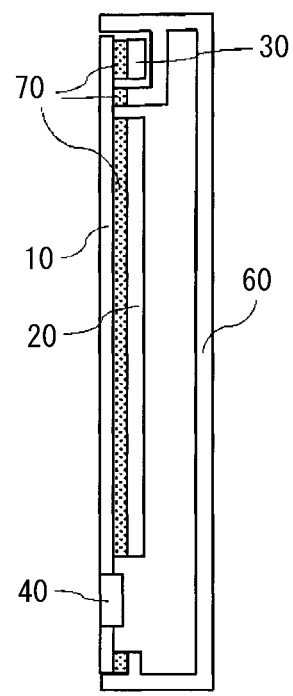

FIGS. 14A and 14B schematically illustrate the structure of the electronic device 1 according to Embodiment 2.

Hereinafter, Embodiment 2 is described assuming the use of a piezoelectric element for the vibration generator 30 in the electronic device 1. FIG. 14A is a front view, and FIG. 14B is a cross-sectional view along the b-b line of FIG. 14A. The electronic device 1 illustrated in FIGS. 14A and 14B is a smartphone in which a touch panel that is a glass plate is disposed on the front face of a housing 60 (for example a metal or resin case) as the panel 10. The panel 10 is attached to the housing 60 by being joined to the housing 60 by the joining member 70. The joining member 70 may, for example, be adhesive or double-sided tape. The display 20 and the vibration generator 30 are attached to the panel 10 by being joined thereto by the joining member 70. Suitable examples of the joining member 70 for attaching the display 20 to the panel 10 include optical elasticity resin, which is clear and colorless acrylic ultraviolet curing adhesive. Suitable examples of the joining member 70 for attaching the vibration generator 30 to the panel 10 include waterproof double-sided tape and adhesive that has thermosetting properties, ultraviolet curable properties, or other such properties. Like the panel 10, the input interface 40 is attached to the housing 60. In this example, the panel 10, display 20, and vibration generator 30 are each generally rectangular.

Figures 15A, 15B, 15C:
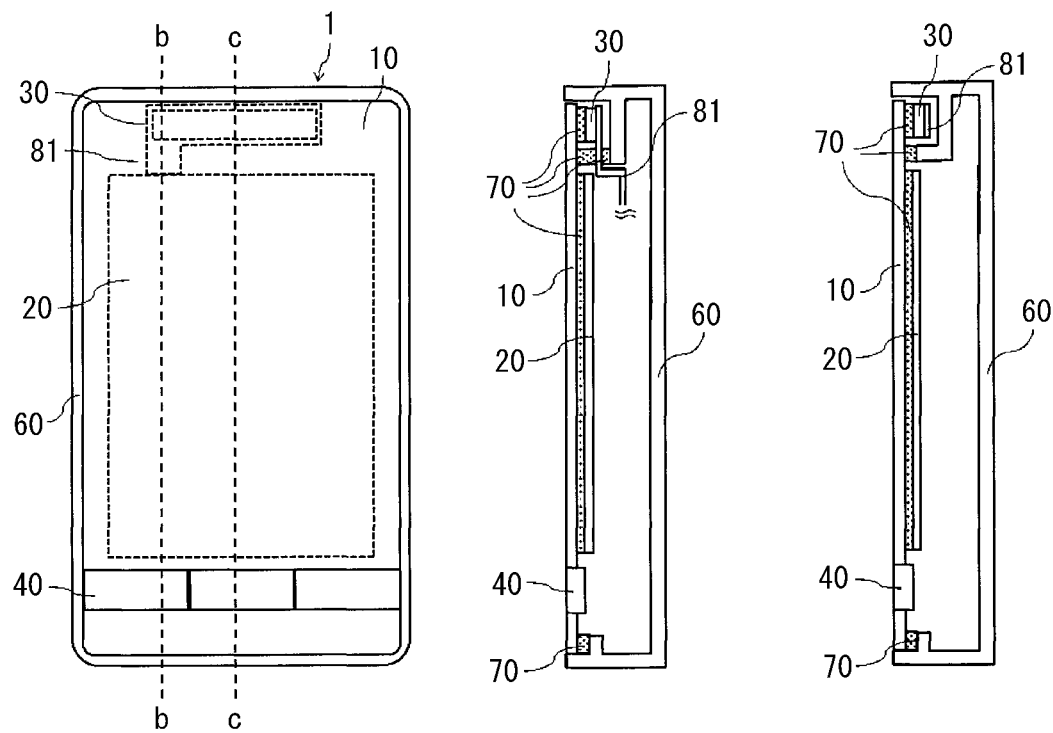
FIGS. 15A, 15B, and 15C illustrate the detailed structure of the electronic device according to Embodiment 2.

FIGS. 15A, 15B, and 15C illustrate the detailed structure of the electronic device 1 according to Embodiment 2. FIG. 15A is a front view, FIG. 15B is a cross-sectional view along the b-b line of FIG. 15A, and FIG. 15C is a cross-sectional view along the c-c line of FIG. 15A. As illustrated in FIGS. 15B and 15C, the vibration generator 30 is attached to the panel 10 by being joined near the upper end of the panel 10 via the joining member 70. The lower end of the panel 10 is joined to the housing 60 by the joining member 70. Furthermore, while not illustrated, the right and left ends of the panel 10 are also each joined to the housing 60 by the joining member 70. The upper end of the panel 10, however, is not joined to the housing 60. In other words, the upper end of the panel 10 is a free end.

The electronic device 1 according to Embodiment 2 has a structure such that the end of the panel 10 where the vibration generator 30 is attached is a free end. Accordingly, in the electronic device 1 according to Embodiment 2, vibration of the panel 10 due to displacement of the vibration generator 30 is not easily inhibited. As a result, higher sound pressure characteristics can be achieved.

As illustrated in FIGS. 15B and 15C, in the electronic device 1 according to Embodiment 2, the panel 10 is attached to the housing 60 by being joined thereto by the joining member 70 in an area that, in the longitudinal direction of the panel 10, is between the area where the display 20 is attached to the panel 10 and the area where the vibration generator 30 is attached to the panel 10. The panel 10 and the housing 60 are joined along a direction parallel to the transverse direction of the panel 10. In FIG. 15B, the panel 10 is attached to the housing 60 via the joining member 70 and the below-described flexible printed circuit (FPC) 81. In FIG. 15C, the panel 10 is attached to the housing 60 via the joining member 70. The vibration generator 30 is disposed between the area where the panel 10 and the housing 60 are joined and the upper end of the panel 10. In other words, on the surface of the panel 10 attached to the housing 60, the vibration generator 30 is attached to an area farther outward than the area where the panel 10 and the housing 60 are joined.

Stating that "the end of the panel 10 where the vibration generator 30 is attached is a free end" in the structure of the electronic device 1 according to Embodiment 2 refers to how the area of joining between the panel 10 and the housing 60 is not provided between the end of the panel 10 where the vibration generator 30 is attached and the vibration generator 30. The following illustrates examples of how "the end of the panel 10 where the vibration generator 30 is attached is a free end".

Figure 16A:
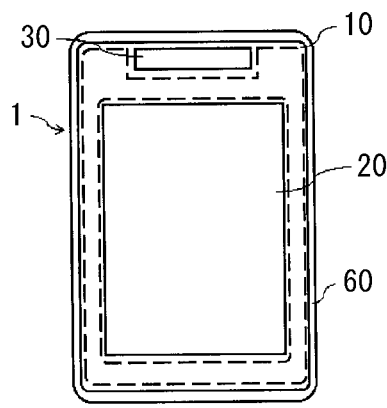
FIGS. 16A, 16B, 16C, and 16D illustrate the area of joining between the panel and the housing in the electronic device according to Embodiment 2.
Figure 16B:
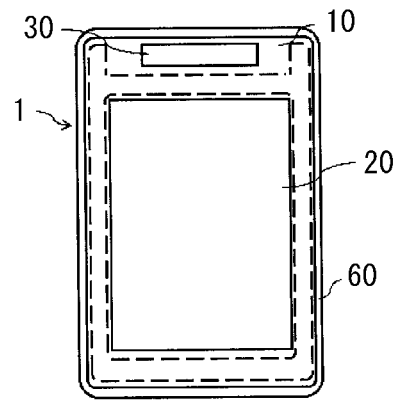
Figure 16C:
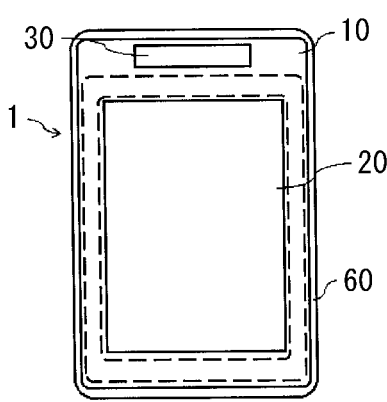
Figure 16D:
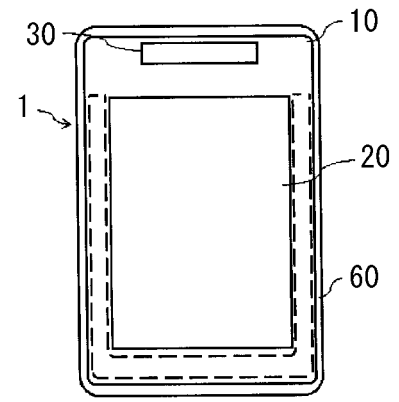

FIGS. 16A to 16D are examples illustrating the area of joining between the panel 10 and the housing 60 (the area where the panel 10 is joined to the housing 60 by the joining member 70) in the electronic device 1 according to Embodiment 2. FIGS. 16A to 16D are front views of the electronic device 1. The display 20 and the vibration generator 30 are attached to the surface of the panel 10 on the inside of the electronic device 1 (i.e. are disposed behind the panel 10, backward from the surface of the drawing) and therefore normally should not be depicted with solid lines. To facilitate understanding of the drawings, however, these components are depicted with solid lines, and only the area of joining between the panel 10 and the housing 60 is depicted with dashed lines (the area of joining between the panel 10 and the housing 60 corresponds to the area surrounded by dashed lines). The input interface 40 and the FPC 81 are also not depicted. As illustrated in FIGS. 16A to 16D, on the surface of the panel 10 attached to the housing 60, the vibration generator 30 is attached to an area farther outward than the area of joining between the panel 10 and the housing 60 in the electronic device 1 according to this disclosure. In FIG. 16A, the area of joining between the panel 10 and the housing 60 is disposed in an area other than the area facing the vibration generator 30 at the upper end of the panel 10 (the end of the panel 10 where the vibration generator 30 is attached). In FIG. 16A, the area of joining between the panel 10 and the housing 60 is disposed at both sides of the vibration generator 30 in the transverse direction of the panel 10. In FIG. 16B, the area of joining between the panel 10 and the housing 60 is not disposed at the upper end of the panel 10, but rather along the right and left ends of the panel 10. Strictly speaking, however, the area of joining disposed at the right and left ends of the panel 10 has a predetermined width in the transverse direction of the panel 10 and is therefore disposed at the upper end of the panel 10 over a distance equaling this width. The area of joining between the panel 10 and the housing 60 is smaller around the vibration generator 30 in the structure illustrated in FIG. 16B than in the structure illustrated in FIG. 16A. Therefore, inhibition of vibration by the panel 10 can be further reduced. In FIG. 16C, the area of joining between the panel 10 and the housing 60 is not disposed at the edge opposite from the upper end of the panel 10 in the area where the vibration generator 30 is attached to the panel 10 or farther outward than imaginary lines that include the short sides of this area. In the structure illustrated in FIG. 16C, the area of joining between the panel 10 and the housing 60 (the area where the panel 10 and the housing 60 are attached by the joining member 70) is farther inward than the position farthest from the upper end of the panel 10 in the area where the vibration generator 30 is attached to the panel 10. The area of joining between the panel 10 and the housing 60 is smaller around the vibration generator 30 in the structure illustrated in FIG. 16C than in the structure illustrated in FIGS. 16A and 16B. Therefore, inhibition of vibration by the panel 10 can be further reduced. In this disclosure, between the display 20 and the vibration generator 30, the panel 10 and the housing 60 do not necessarily need to be joined along the transverse direction of the panel 10. A structure in which only the lower end and the right and left ends of the panel 10 are joined to the housing 60, as illustrated in FIG. 16D, may also be adopted. By joining the panel 10 and the housing 60 along the transverse direction of the panel 10 between the display 20 and the vibration generator 30, however, the panel 10 is supported by the housing 60 around the four sides of the display 20 and is thereby more firmly supported by the housing 60. According to this structure, for example when the panel 10 is a touch panel that detects contact, the risk of the panel 10 flexing when the user presses the panel 10 is reduced, thereby improving usability.

Referring again to FIGS. 15A to 15C, these drawings illustrate the FPC 81 in electrical connection with the vibration generator 30 in the electronic device 1 according to this disclosure. The FPC 81 for example has a structure such that a conductor layer (signal wire) is formed on a film-shaped insulator (base film) made of resin, such as polyimide, and the conductor layer is further covered by an insulator except in an area corresponding to a terminal. The FPC 81 is attached to the surface of the vibration generator 30 (which is a roughly plate-shaped piezoelectric element in this embodiment) opposite the surface that is attached to the panel 10. The terminal of the FPC 81 and an electrode terminal provided in the piezoelectric element are, for example, adhered with a method referred to as Anisotropic Conductive Paste (ACP) connection or Anisotropic Conductive Film (ACF) connection. The FPC 81 in this case covers roughly the entire surface of the piezoelectric element opposite from the surface attached to the panel 10. As described above, the FPC 81 has resin, such as polyimide, as a substrate. Therefore, when covering the surface of the piezoelectric element, the FPC 81 also fulfills the role of a mitigation member that absorbs external shock, thereby preventing damage to the piezoelectric element. The FPC 81 need not cover the entire surface of the piezoelectric element and may instead cover only a portion thereof.

As illustrated in FIG. 15B, the FPC 81 extends from an area attached to the vibration generator 30 (piezoelectric element), is for example connected electrically to a non-illustrated controller 50, and transmits an electric signal applied by the controller 50 to the vibration generator 30. In the FPC 81, a partial area of the area (extension) extending from the area attached to the vibration generator 30 (piezoelectric element) is joined to the panel 10 by the joining member 70, and an area opposite from the partial area joined to the panel 10 is joined to the housing 60 by the joining member 70. The joining member 70 used here may, for example, be waterproof double-sided tape or adhesive.

In the electronic device 1 according to Embodiment 2, the upper end of the panel 10 is not joined to the housing 60. Therefore, as illustrated in FIGS. 15B and 15C, a gap occurs between the upper end of the panel 10 and the housing 60. When the electronic device 1 is to be provided with a waterproof structure, further penetration of moisture to the inside of the electronic device 1 can be prevented by joining this gap, i.e. the area of the panel 10 between the area where the display 20 is attached and the area where the vibration generator 30 is attached, to the housing 60 via the waterproof joining member 70. In other words, by joining the panel 10 and the housing 60 with the joining member 70, the electronic device 1 according to this disclosure can be provided with a waterproof structure with respect to members disposed inside the electronic device 1, except for the vibration generator 30 disposed farther outward than the area of joining between the panel 10 and the housing 60. As illustrated in FIG. 15B, however, there is a portion where the above-described extension of the FPC 81 is positioned between the joining members 70. At this portion, the extension of the FPC 81 is joined to the panel 10 by a first joining member and is joined to the housing 60 by a second joining member. Here, it is important that the extension of the FPC 81, the first joining member, and the second joining member be in close contact with no gap so as to provide a waterproof structure. In other words, the extension of the FPC 81 may be in close contact with and be covered by the first joining member and the second joining member. One method of implementing this structure is to use a sheet made of deformable silicone gel for at least one of the first joining member and the second joining member, place the extension, the first joining member, and the second joining member in close contact with no gap therebetween, and then join these components to the panel 10 and the housing 60.

Another method for configuring the extension of the FPC 81 to be in close contact with and covered by the first joining member and the second joining member is to eliminate a gap occurring between the extension of the FPC 81 and the first or second joining member by filling the gap with an adhesive material having fluidity.

Methods other than the aforementioned methods for providing the electronic device 1 with a waterproof structure (except for waterproofing the vibration generator 30) for example include a method to insert the extension of the FPC 81 in the hollow portion of a ring-shaped member and sandwich the ring-shaped member having the extension inserted therein between the panel 10 and the housing 60 so as to join the extension thereto via the ring-shaped member. In greater detail, the extension of the FPC 81 is inserted into the hollow portion of a ring-shaped rubber member (grommet), and the grommet is pressed into the gap between the panel 10 and the housing 60 so as to be sandwiched therebetween with the grommet and the extension in close contact. With such a method, no gap occurs between the panel 10, the housing 60, and the FPC 81. In other words, the panel 10 and the housing 60 can be joined without the occurrence of a gap connecting the inside and the outside of the electronic device 1, thereby providing a waterproof structure.

With the above-described method, except for the vibration generator 30, the electronic device 1 can be provided with a waterproof structure. The area in which the vibration generator 30 and the FPC 81 are connected, however, i.e. the electrode terminal of the vibration generator 30 and the terminal of the FPC 81 are exposed to the exterior. Therefore, the exposed area does not have a waterproof structure. Accordingly, if a conductive liquid, such as water, attaches to the area where the vibration generator 30 and the FPC 81 are connected, a short circuit might occur in this area. Therefore, the area where the vibration generator 30 and the FPC 81 are connected also needs to be provided with a waterproof structure (or the exposed area needs to be covered with an insulating material). To address this issue, for example the electrode terminal of the vibration generator 30 and the terminal of the FPC 81 are preferably coated with an insulating material, such as silicone, urethane, or fluorine, i.e. the area of the FPC 81 connected to the vibration generator 30 is preferably covered with an insulating resin member.

In the electronic device 1 according to Embodiment 2, one end of the FPC 81 is connected to the vibration generator 30, and one end of the extension of the FPC 81 is joined to the panel 10 and the housing 60 via the joining member 70. If the area of the FPC 81 between the area joined to the vibration generator 30 and the area joined to the panel 10 and the housing 60 is stiff, without flexing, then when vibration occurs in the panel 10 due to displacement of the vibration generator 30, the FPC 81 might fracture due to vibration of the panel 10, or vibration of the panel 10 might be inhibited by the FPC 81. Accordingly, the area of the FPC 81 between the area joined to the vibration generator 30 and the area joined to the panel 10 and the housing 60 is preferably sufficiently flexed in advance before joining the FPC 81 to the vibration generator 30, the panel 10, and the housing 60.

Figures 17A, 17B, 17C:
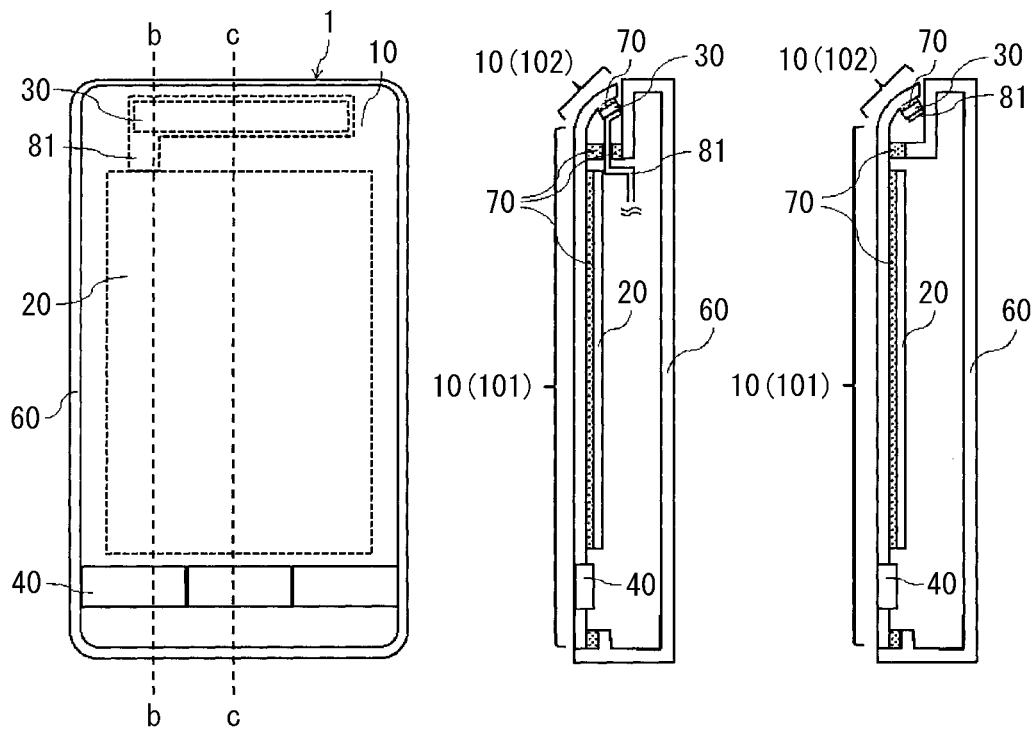
FIGS. 17A, 17B, and 17C illustrate a first modification to the structure of Embodiment 2.

FIGS. 17A, 17B, and 17C illustrate a first modification to the structure of Embodiment 2. FIG. 17A is a front view, FIG. 17B is a cross-sectional view along the b-b line of FIG. 17A, and FIG. 17C is a cross-sectional view along the c-c line of FIG. 17A. As compared to the structure illustrated in FIGS. 15A to 15C, the shape of the panel 10 differs in this modification. As illustrated in FIG. 17A to 17C, the panel 10 in this modification includes a plate-shaped portion 101 that is roughly in the shape of a plate, is disposed in parallel to the back surface of the electronic device 1, and to which the display 20 is attached, and a curved portion 102 that extends from one end of the plate-shaped portion 101. In the panel 10, the curved portion 102 extends from the upper end of the plate-shaped portion 101 and constitutes a portion of the upper side of the electronic device 1. The vibration generator 30 is attached to the curved portion 102 of the panel 10 by being joined thereto by the joining member 70. In the panel 10, the lower end of the plate-shaped portion 101 is joined to the housing 60 by the joining member 70. Furthermore, while not illustrated, the right and left ends of the plate-shaped portion 101 are also each joined to the housing 60 by the joining member 70. However, the upper end of the panel 10, i.e. the end of the curved portion 102, is not joined to the housing 60. In other words, the end of the curved portion 102 of the panel 10 is a free end.

The electronic device 1 according to the first modification has a structure such that the end of the panel 10 where the vibration generator 30 is attached is a free end. Accordingly, in the electronic device 1 according to this disclosure, vibration of the panel 10 is not easily inhibited. As a result, higher sound pressure characteristics can be achieved.

The panel 10 is joined to the housing 60 in an area that, in the longitudinal direction of the panel 10, is between the area where the display 20 is attached to the panel 10 and the area where the vibration generator 30 is attached to the panel 10. As illustrated in FIG. 17A to 17C, the plate-shaped portion 101 of the panel 10 and the housing 60 are joined by the joining member 70. In FIG. 17B, the panel 10 is attached to the housing 60 via the joining member 70 and the FPC 81. In FIG. 17C, the panel 10 is attached to the housing 60 via the joining member 70. The panel 10 and the housing 60 are joined along a direction parallel to the transverse direction of the panel 10. According to this structure, the panel 10 is supported by the housing 60 around the four sides of the display 20 and is thereby firmly supported by the housing 60. According to this structure, for example when the panel 10 is a touch panel that detects contact, the risk of the panel 10 flexing due to pressure on the panel 10 when the user presses the panel 10 is reduced, thereby improving usability. Between the display 20 and the vibration generator 30, the panel 10 and the housing 60 do not necessarily need to be joined along the transverse direction of the panel 10, and a structure in which only the lower end and the right and left ends of the panel 10 are joined to the housing 60 may also be adopted.

Figure 18:
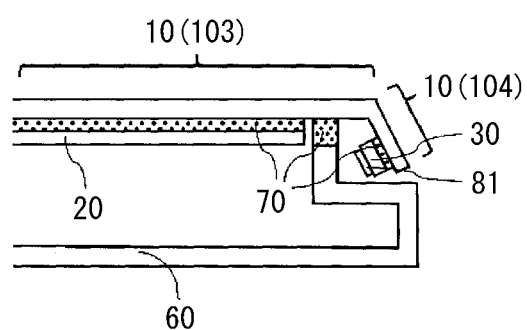
FIG. 18 is a cross-sectional diagram of an electronic device illustrating a second modification to the structure of Embodiment 2.

FIG. 18 is a cross-sectional diagram of the electronic device 1, illustrating a second modification to the structure of Embodiment 2. As compared to the structure illustrated in the first modification, the shape of the panel differs in this modification. The panel 10 in this modification is disposed parallel to the back surface of the electronic device 1 and includes a first surface 103 to which the display 20 is attached and a second surface 104 that is formed integrally with the first surface 103 where an end of the panel 10 is bent. The vibration generator 30 is attached to the second surface 104 of the panel 10 by being joined thereto by the joining member 70. In the panel 10, the lower end of the first surface 103 is joined to the housing 60 by the joining member 70. Furthermore, while not illustrated, the right and left ends of the first surface 103 are also each joined to the housing 60 by the joining member 70. However, the upper end of the panel 10, i.e. the end at the second surface, is not joined to the housing 60. In other words, the second surface 104 of the panel 10 is a free end.

The electronic device 1 according to the second modification has a structure such that the end of the panel 10 where the vibration generator 30 is attached is a free end. With such a structure, in the electronic device 1 according to this disclosure, vibration of the panel 10 is less easily inhibited than when the end of the second surface 104 is joined to the housing 60. As a result, higher sound pressure characteristics can be achieved.

Figure 19:
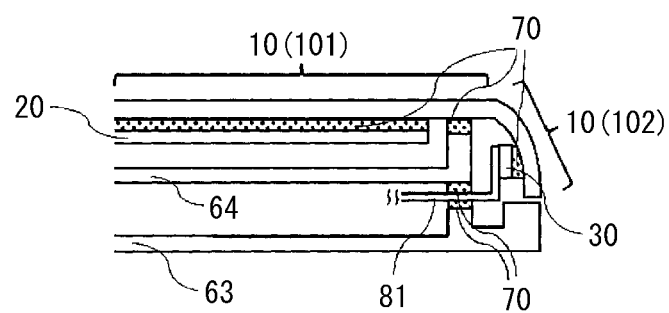
FIG. 19 is a cross-sectional diagram of an electronic device illustrating a third modification to the structure of Embodiment 2.

FIG. 19 is a cross-sectional diagram of the electronic device 1, illustrating a third modification to the structure of Embodiment 2. In the electronic device 1 in this modification, the housing is configured by a first case member 63 and a second case member 64. In the electronic device 1, the panel 10, the first case member 63, and the second case member 64 are stacked in the direction of thickness of the electronic device 1 and are joined together. As in the first modification, the panel 10 is formed by the plate-shaped portion 101 and the curved portion 102, and the vibration generator 30 is attached to the curved portion 102. The end of the curved portion 102 is not joined to the housing, i.e. is a free end. Therefore, vibration of the panel 10 is not easily inhibited with this structure. The shape of the panel 10 in this modification is not limited to this example and may be any of the various shapes described thus far.

The FPC 81 is attached to the surface of the vibration generator 30 opposite the surface that is attached to the panel 10. The FPC 81 extends from an area attached to the vibration generator 30, is connected to the controller 50, and transmits an electric signal applied by the controller 50 to the vibration generator 30. In the FPC 81, a portion of the area (extension) extending from the area attached to the vibration generator 30 is joined to the first case member 63, and an area opposite from this area is joined to the second case member 64. Here, the FPC 81 is joined to the first case member 63 and the second case member 64 by the joining member 70, and the FPC 81 and the joining member 70 are in close contact. The structure for close contact between the FPC 81 and the joining member 70 is achieved with a similar method to the ones described above.

Although Embodiment 2 has been described based on drawings and examples, it is to be noted that various changes and modifications will be apparent to those skilled in the art based on the present disclosure. Therefore, such changes and modifications are to be understood as included within the scope of this disclosure. For example, the case of the joining member 70 for joining the panel 10 and the housing 60 being double-sided tape or adhesive has been described, but these need not be used separately and may instead be used together. In this case, for example double-sided tape may be adhered to the housing 60, and adhesive with a higher adhesive strength than the double-sided tape may be applied onto the double-sided tape, with the result being joined to the panel 10. The double-sided tape and the adhesive can bond together firmly, thereby firmly joining the panel 10 and the housing 60. Instead of applying adhesive onto the double-sided tape, a portion of the double-sided tape 71 may be gouged out and the resulting space filled with adhesive in order to join the panel 10 and the housing 60. Examples of the adhesive used in this case include non-heat hardening adhesive and moisture-curable elastic adhesive that reacts with moisture (humidity) in the air. The primary component in a moisture-curable elastic adhesive is, for example, a special polymer that includes a silyl group.

In the first modification to the structure of Embodiment 2, a structure in which the display 20 is attached to the plate-shaped portion 101 of the panel 10 was described, but this example is not limiting. A portion or all of the display 20 may be attached to the curved portion 102 of the panel 10. Furthermore, in the second modification to the structure of this disclosure, a structure in which the display 20 is attached to the first surface 103 of the panel 10 was described, but this example is not limiting. A portion or all of the display 20 may be attached to the second surface 104 of the panel 10.

A structure in which the vibration generator 30 is attached to the panel 10 by the joining member 70 has been described, but this example is not limiting. An intermediate member may be disposed between the panel 10 and the vibration generator 30. When, for example, a piezoelectric element is used as the vibration generator 30, the intermediate member is a member that reduces excessive deformation of the piezoelectric element and may, for example, mitigate transmission of an external force to the piezoelectric element. The intermediate member may, for example, be made from an elastic material, such as rubber or silicone, or from polyamide resin. Examples of a polyamide resin include Reny®, which is formed from crystalline thermoplastic resin obtained from m-Xylylenediamine and adipic acid and has excellent strength and elasticity. Such a polyamide resin may be used as a base polymer and be reinforced by glass fiber, metallic fiber, carbon fiber, or the like to yield a reinforced resin. The strength and elasticity may be appropriately adjusted in accordance with the amount of glass fiber, metallic fiber, carbon fiber, or the like added to the polyamide resin. The above-described reinforced resin may, for example, be formed by interweaving glass fiber, metallic fiber, carbon fiber, or the like into a substrate, impregnating the substrate with resin, and allowing the resin to harden. The reinforced resin also may be formed by mixing finely cut fibers into liquid resin and then allowing the resin to harden. The reinforced resin may also be a laminate of a substrate with interwoven fiber and a resin layer.

Propagation of an external force to the vibration generator 30 has been described as being mitigated by the FPC 81 by adopting a structure in which the opposite surface of the vibration generator 30 from the surface attached to the panel 10 is covered by the FPC 81. In this disclosure, however, a mitigation member that is separate from the FPC 81 and can mitigate external shocks may be provided. This mitigation member for example may have a similar structure to the above-described intermediate member, be processed into a plate-like shape, and be attached to the vibration generator 30 or the FPC 81. Ultraviolet curable resin or the like may be dripped onto the vibration generator 30 and hardened so as to form the mitigation member.

In the electronic device 1 according to Embodiment 2, the vibration generator 30 has been described as being attached to the panel 10, which generates sound due to displacement of the vibration generator 30. However, the member that generates sound is not limited to the panel 10. Any member that constitutes the electronic device 1 and has a portion with a roughly flat plate shape can generate sound. Examples of such a member include the case member forming the housing of the electronic device 1, a battery cover made from polycarbonate and attached to the case member detachably, and the like. For example, in a box-shaped case member with a roughly rectangular bottom and side portions that extend perpendicularly from the four edges of the bottom, the vibration generator 30 is attached to the bottom of the case member. The bottom of the case member vibrates due to displacement of the vibration generator 30 and generates sound. So that the end of the bottom of the case member to which the vibration generator 30 is attached becomes a free end, it suffices to provide a notch between the end of the bottom and the side portion (i.e. to configure the end of the bottom and the side portion so as not to be integrated). It is possible to provide the notch on the bottom of the case member only between the edge and the side portion where the vibration generator 30 is attached, or also to provide a notch on the bottom at a portion (or all) of the section between side portions and each of two edges orthogonal to the edge where the vibration generator 30 is attached. A structure may also be adopted so that a notch is provided at a portion of the edge where the vibration generator 30 is attached on the bottom of the case member. According to these configurations, vibration of the case member due to displacement of the vibration generator 30 is not easily inhibited, thereby achieving higher sound pressure characteristics.

A smartphone has been described as an example of this disclosure, but this disclosure is not limited to smartphones. This disclosure is also applicable to a mobile phone in which a housing at the operation interface side and a housing at the display side are connected so as to be foldable. The mobile phone may also be a slide type in which, from a state of overlap between the housing at the operation interface side and the housing at the display side, one of the housings is slid in one direction; a turn type in which the housing at the operation interface side and the housing at the display side are in overlap, and one of the housings is rotated about an axis along the direction of overlap; or a straight type in which the housing at the operation interface side and the housing at the display side are disposed in one housing, without a connecting portion. The mobile phone may also be a double-axis hinge type that can be both opened/closed and rotated.

An electronic device 1 according to this disclosure has the following characteristics.

In the electronic device 1, a first end of the panel 10 is attached to the housing 60 by the joining member 70, a second end of the panel 10 opposite the first end is joined to the housing 60 by the sheet member 80, a first portion of the sheet member 80 is joined to the panel 10, and a second portion of the sheet member 80 differing from the first portion is joined to the housing 60; and a fixation strength between the second end of the panel 10 and the housing 60 is lower than a fixation strength between the first end of the panel 10 and the housing 60.

REFERENCE SIGNS LIST

1 Electronic device
10 Panel
20 Display
30 Vibration generator
40 Input interface
50 Controller
60 Housing 61 Rear case
62 Cover member
63 First case member
64 Second case member
70 Joining member (double-sided tape)
71 First double-sided tape
72 Second double-sided tape
80 Sheet member
81 FPC
90 Buffer member
101 Plate-shaped portion
102 Curved portion
103 First surface
104 Second surface
110 Anti-scattering sheet

The invention claimed is:

1. An electronic device comprising:
a housing;
a panel held by the housing;
a vibration generator attached to the panel; and
a sheet member; wherein
the panel deforms due to deformation of the vibration generator to transmit human body vibration sound to an object that contacts the panel;
a first portion of the sheet member is joined to the panel, and a second portion of the sheet member differing from the first portion is joined to the housing; and
between the first portion and the second portion, the sheet member includes an area to which neither the panel nor the housing is attached.

2. The electronic device of claim 1, wherein the area of the sheet member deforms along with deformation of the panel.

3. The electronic device of claim 2, wherein the area of the sheet member deforms in a direction parallel to a direction of vibration of the panel.

4. The electronic device of claim 2, wherein the area of the sheet member deforms in a direction perpendicular to a direction of vibration of the panel.

5. The electronic device of claim 1, wherein
the vibration generator is attached to a surface of the sheet member opposite a surface of the sheet member attached to the panel; and
in plan view of the panel, an area of the sheet member where the panel is attached at least overlaps an area of the sheet member where the vibration generator is attached.

6. The electronic device of claim 5, wherein the area of the sheet member to which neither the panel nor the housing is attached is formed adjacent to the area of the sheet member where the panel is attached or adjacent to the area of the sheet member where the vibration generator is attached.

7. The electronic device of claim 1, wherein a width of the area of the sheet member in a direction of a short side of the panel is changeable.

8. The electronic device of claim 1, wherein the sheet member is made of one of PET film, an acrylic film, and a polyamide resin film.

9. The electronic device of claim 1, wherein the sheet member is a touch panel.

10. The electronic device of claim 1, wherein the sheet member is an anti-scattering sheet that prevents scattering of glass forming the panel.

11. The electronic device of claim 1, wherein the sheet member is double-sided tape.

12. The electronic device of claim 11, wherein in the double-sided tape, an adhesive layer is not disposed in the area to which neither the panel nor the housing is attached.

13. An electronic device comprising:
a housing;
a panel held by the housing;
a vibration generator attached to the panel; and
a sheet member; wherein
the panel deforms due to deformation of the vibration generator to transmit human body vibration sound to an object that contacts the panel;
a first portion of the sheet member is joined to the panel, and a second portion of the sheet member differing from the first portion is joined to the housing; and
between the first portion and the second portion, the sheet member includes a deformation area.

14. An electronic device comprising:
a housing;
a panel held by the housing; and
a vibration generator attached to the panel; wherein
the panel vibrates due to deformation of the vibration generator to transmit human body vibration sound to an object that contacts the panel;
a first end of the panel is attached to the housing by a joining member;
a second end of the panel opposite the first end is joined to the housing by a sheet member;
a first portion of the sheet member is joined to the panel, and a second portion of the sheet member differing from the first portion is joined to the housing; and
a fixation strength between the second end of the panel and the housing is lower than a fixation strength between the first end of the panel and the housing.

15. An electronic device comprising:
a housing;
a panel attached to the housing; and
a vibration generator attached to the panel; wherein
the panel deforms due to deformation of the vibration generator to transmit human body vibration sound to an object that contacts the panel;
an end of the panel where the vibration generator is attached is a free end; and
a film-shaped substrate attached to a surface of the vibration generator opposite a surface of the vibration generator attached to the panel; wherein
the substrate includes an extension extending from an area of the substrate attached to the vibration generator; and
a partial area of the extension is joined to the panel, and an area opposite the partial area joined to the panel is joined to the housing.

16. The electronic device of claim 15, wherein on a surface of the panel attached to the housing, the vibration generator is attached to an area farther outward than an area attached to the housing.

17. The electronic device of claim 16, wherein the panel is attached to the housing farther inward than a position farthest from the end of the panel that is a free end within the area where the vibration generator is attached to the panel.

18. The electronic device of claim 15, wherein
the extension is joined to the panel by a first joining member and is joined to the housing by a second joining member; and
the extension is in close contact with and covered by the first joining member and the second joining member.

19. The electronic device of claim 18, wherein at least one of the first joining member and the second joining member is silicone gel.

20. The electronic device of claim 15, further comprising a ring-shaped member; wherein
the extension is inserted into a hollow portion of the ring-shaped member and sandwiched by the ring-shaped member; and
the extension is joined to the panel and the housing via the ring-shaped member.

21. The electronic device of claim 15, wherein an area of the substrate connected to the vibration generator is covered by an insulating member.

22. An electronic device comprising:
a housing;
a panel attached to the housing; and
a vibration generator attached to the panel; wherein
the panel deforms due to deformation of the vibration generator to transmit human body vibration sound to an object that contacts the panel;
an end of the panel where the vibration generator is attached is a free end;
the panel includes a plate-shaped portion and a curved portion extending from one end of the plate-shaped portion;
the vibration generator is attached to the curved portion of the panel; and
the curved portion of the panel is a free end.

23. An electronic device comprising:
a housing;
a panel attached to the housing; and
a vibration generator attached to the panel; wherein
the panel deforms due to deformation of the vibration generator to transmit human body vibration sound to an object that contacts the panel;
an end of the panel where the vibration generator is attached is a free end;
the panel includes a first surface and a second surface formed integrally with the first surface where an end of the panel is bent;
the vibration generator is attached to the second surface of the panel; and
the second surface of the panel is a free end.

24. The electronic device of claim 15, wherein the vibration generator is formed by a magnetostrictor and a coil.

25. The electronic device of claim 15, wherein the vibration generator is formed by a piezoelectric element.

* * * * *